(12) United States Patent
Patel et al.

(10) Patent No.: US 9,898,601 B2
(45) Date of Patent: *Feb. 20, 2018

(54) ALLOCATION OF SHARED SYSTEM RESOURCES

(71) Applicant: Amazon Technologies, Inc., Seattle, WA (US)

(72) Inventors: Rahul Gautam Patel, Austin, TX (US); Nachiketh Rao Potlapally, Arlington, VA (US); William John Earl, Burien, WA (US); Matthew Shawn Wilson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,408

(22) Filed: Jul. 6, 2017

(65) Prior Publication Data

US 2017/0308696 A1    Oct. 26, 2017

Related U.S. Application Data

(63) Continuation of application No. 14/502,891, filed on Sep. 30, 2014, now Pat. No. 9,703,951.

(51) Int. Cl.
*G06F 21/44* (2013.01)
*G06F 21/55* (2013.01)
(Continued)

(52) U.S. Cl.
CPC .......... *G06F 21/55* (2013.01); *G06F 9/45533* (2013.01); *G06F 9/468* (2013.01); *G06F 9/5077* (2013.01); *G06F 21/53* (2013.01)

(58) Field of Classification Search
CPC ......... H04L 63/10; G06F 21/55; G06F 21/53; G06F 21/567
See application file for complete search history.

(56) References Cited

U.S. PATENT DOCUMENTS 5,437,047 A    7/1995  Nakamura
5,581,463 A   12/1996  Constant et al.
(Continued)

OTHER PUBLICATIONS

U.S. Appl. No. 14/502,891 , "Final Office Action", dated Aug. 31, 2016, 10 pages.
(Continued)

*Primary Examiner* — Izunna Okeke
(74) *Attorney, Agent, or Firm* — Kilpatrick Townsend & Stockton LLP

(57) ABSTRACT

Techniques are described for allocating resources to a task from a shared hardware structure. A plurality of tasks may execute on a processor, wherein the processor may include one or more processing cores and each task may include a plurality of computer executable instructions. In accordance with one technique for allocating resources to a task from a shared hardware structure amongst multiple tasks, aspects of the disclosure describe assigning a first identifier to a first task from the plurality of tasks, associating a portion of the shared hardware resource with the first identifier, and restricting access and/or observability for computer executable instructions executed from any other task than the first task to the portion of the hardware resource associated with the first identifier.

21 Claims, 15 Drawing Sheets

(51) Int. Cl.
*G06F 9/455* (2018.01)
*G06F 21/53* (2013.01)
*G06F 9/46* (2006.01)
*G06F 9/50* (2006.01)

(56) References Cited

U.S. PATENT DOCUMENTS

| | | | |
|---|---|---|---|
| 5,742,792 | A | 4/1998 | Yanai et al. |
| 7,036,002 | B1 | 4/2006 | Ugon et al. |
| 7,054,883 | B2 | 5/2006 | Heasley et al. |
| 8,146,078 | B2 | 3/2012 | Bennett et al. |
| 8,583,467 | B1 | 11/2013 | Morris et al. |
| 8,738,860 | B1 | 5/2014 | Joyce et al. |
| 8,856,400 | B1 | 10/2014 | Davidson et al. |
| 8,972,637 | B1 | 3/2015 | Hushon, Jr. et al. |
| 9,026,694 | B1 | 5/2015 | Davidson et al. |
| 9,378,363 | B1 | 6/2016 | Potlapally et al. |
| 9,491,112 | B1 | 11/2016 | Patel et al. |
| 2003/0061262 | A1 | 3/2003 | Hahn et al. |
| 2003/0084336 | A1 | 5/2003 | Anderson et al. |
| 2005/0097556 | A1 | 5/2005 | Code et al. |
| 2007/0136531 | A1 | 6/2007 | Liu et al. |
| 2008/0040481 | A1 | 2/2008 | Joshi et al. |
| 2008/0126820 | A1 | 5/2008 | Fraser et al. |
| 2009/0089564 | A1 | 4/2009 | Brickell et al. |
| 2011/0010461 | A1 | 1/2011 | Lassila et al. |
| 2011/0055479 | A1 | 3/2011 | West et al. |
| 2011/0145657 | A1 | 6/2011 | Bishop et al. |
| 2011/0238919 | A1 | 9/2011 | Gibson et al. |
| 2012/0137075 | A1 | 5/2012 | Vorbach et al. |
| 2012/0224482 | A1 | 9/2012 | Gramling et al. |
| 2012/0331464 | A1 | 12/2012 | Saito et al. |
| 2013/0080641 | A1 | 3/2013 | Lui et al. |
| 2013/0304903 | A1 | 11/2013 | Mick et al. |
| 2014/0075125 | A1 | 3/2014 | Biswas et al. |
| 2014/0201303 | A1 | 7/2014 | Dalal et al. |
| 2014/0201402 | A1 | 7/2014 | Dalal et al. |
| 2014/0372786 | A1 | 12/2014 | Wohlgemuth et al. |
| 2014/0378094 | A1 | 12/2014 | Gillick et al. |
| 2015/0052614 | A1* | 2/2015 | Crowell ............... G06F 21/566 726/25 |
| 2015/0067673 | A1 | 3/2015 | Tien et al. |
| 2015/0128142 | A1 | 5/2015 | Fahim et al. |
| 2015/0277949 | A1* | 10/2015 | Loh .................... G06F 9/45558 711/152 |
| 2016/0092677 | A1 | 3/2016 | Patel et al. |

OTHER PUBLICATIONS

U.S. Appl. No. 14/502,891, "Non-Final Office Action", dated Apr. 8, 2016, 10 pages.

U.S. Appl. No. 14/502,891, "Notice of Allowance", dated Mar. 13, 2017, 12 pages.

U.S. Appl. No. 14/509,984, filed Oct. 8, 2014, Titled: Noise Injected Virtual Timer.

U.S. Appl. No. 14/509,980, filed Oct. 8, 2014, Titled: Microarchitecturally Delayed Timer.

U.S. Appl. No. 14/566,642, filed Dec. 10, 2014, Titled: Allocating Processor Resources Based on a Service-Level Agreement.

U.S. Appl. No. 14/566,648, filed Dec. 10, 2014, Titled: Allocating Processor Resources Based on a Task Identifier.

U.S. Appl. No. 15/190,045, filed Jun. 22, 2016, Titled: Noise Injected Virtual Timer.

U.S. Appl. No. 15/345,341, filed Nov. 7, 2016, Titled: Allocating Processor Resources Based on a Task Identifier.

Aciicmez et al., "On the Power of Simple Branch Prediction Analysis", International As Soc i at i on for Cryptologic Research, Oct. 2006, pp. 1-16.

Agosta et al., "Countermeasures for the Simple Branch Prediction Analysis", International Association for Cryptologic Research, Dec. 21, 2006, pp. 1-4.

Page, "Partitioned Cache Architecture as a Side-Channel Defence Mechanism", Internet Citation, Available online at http://citeseer.ist.psu.edu/cache/papers/cs2/433/http:zSzzSzeprint.iacr.orgzSz2005zSz280.pdf/page05partitioned.pdf, 2005, 14 pages.

PCT/US2015/052957, "International Search Report and Written Opinion", dated Dec. 17, 2015, 14 pages.

Percival, "Cache missing for fun and profit", Internet Citation, Available online at www.daemonology.net/papers/htt.pdf, May 2005, pp. 1-13.

Yarom et al., "Flush+Reload: a High Resolution, Low Noise, L3 Cache Side-Channel Attack", IACR Cryptology ePrint Archive, 448, 2013, 14 pages.

Zhou et al., "Side-Channel Attacks: Ten Years After Its Publication and the Impacts on Cryptographic Module Security Testing", International Association for Cryptologic Research, Oct. 2005, pp. 1-34.

* cited by examiner

ALLOCATION OF SHARED SYSTEM RESOURCES

CROSS REFERENCE TO RELATED APPLICATIONS

This application is a Continuation of U.S. application Ser. No. 14/502,891, filed Sep. 30, 2014, issued as U.S. Pat. No. 9,703,951 on Jul. 11, 2017, and titled "ALLOCATION OF SHARED SYSTEM RESOURCES", the contents of which are herein incorporated in its entirety.

BACKGROUND

Any given computing device may execute several security sensitive and non-security sensitive tasks, simultaneously or near simultaneously, on a computing system. Some non-security sensitive tasks may include malicious tasks that may either subvert the execution of the security sensitive task or steal information from the execution of the security sensitive task. A simple example of a security sensitive task may include a user trying to establish a secure communication session with a backend server, such as a bank, using a web interface to access his or her account information. A malicious task that can gain access to the session key for the secure communication session between the user and the backend server may be able to connect to the backend server and gain access to the user's sensitive information.

In a multi-tenant environment, where multiple tenants or users may concurrently execute tasks on the same computing device, the risk to the security sensitive tasks from potentially executing malicious tasks is exacerbated, since the computing resources of the computing device are no longer dedicated to a single tenant.

BRIEF DESCRIPTION OF DRAWINGS

Various embodiments in accordance with the present disclosure will be described with reference to the drawings, in which.

DETAILED DESCRIPTION

Figure 1:
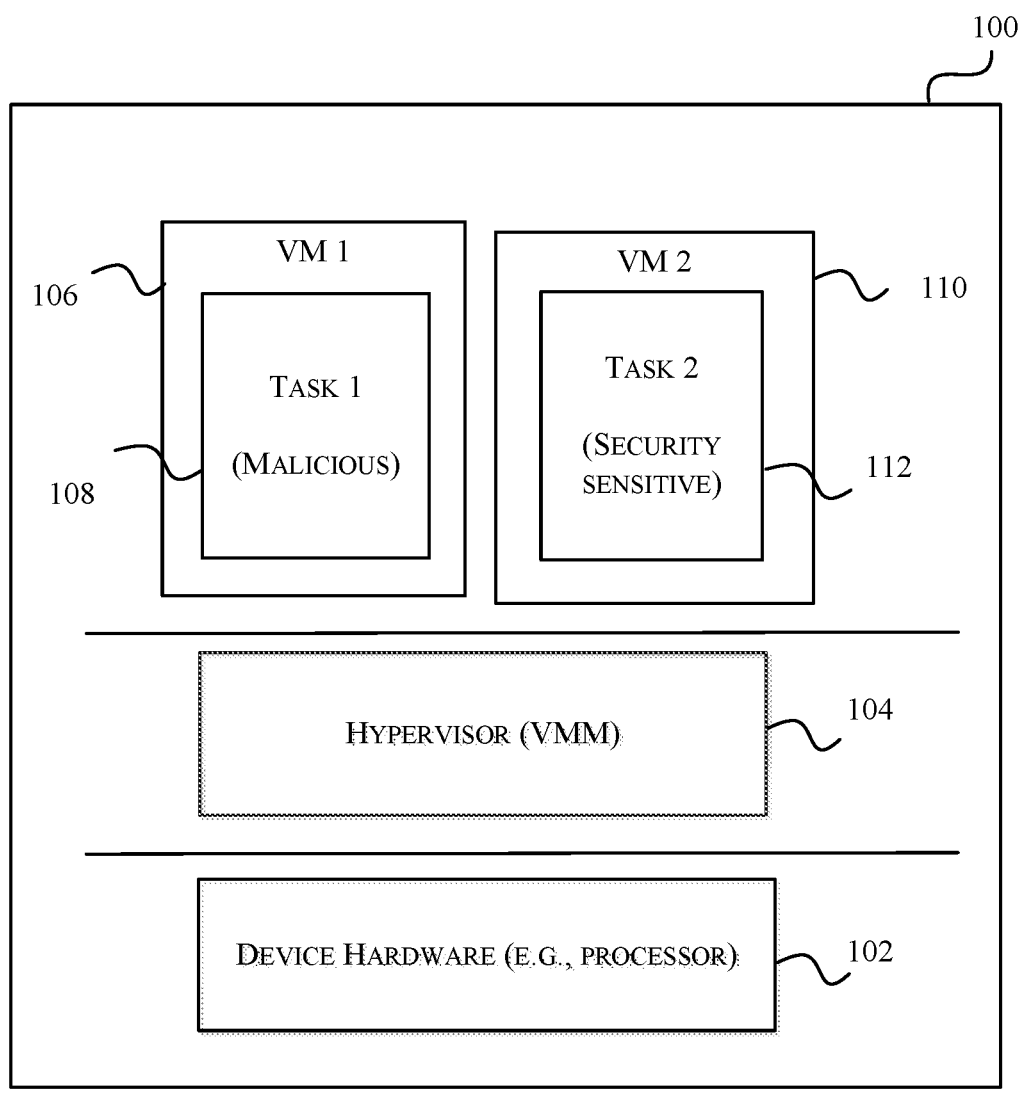
FIG. 1 illustrates an exemplary execution environment in which virtualization technology is used for performing embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are described for protecting a security sensitive task (or virtual machine that executes the security sensitive task) from exposure to a malicious task (or virtual machine) concurrently executing on the same system. In one aspect, techniques describe assigning an identifier to the security sensitive task from the plurality of tasks; associating a portion of the shared hardware resource (e.g., a way of a cache) with the task identifier; and restricting access for computer executable instructions executed from the security sensitive task to a portion of the shared hardware resources associated with the security sensitive task identifier.

Current processing and system architectures are capable of executing a plurality of processing tasks simultaneously. These tasks may include a myriad of security sensitive tasks and non-security sensitive tasks. In addition, in some instances, malicious tasks may manage to install themselves and execute alongside security sensitive tasks.

A hardware processor may support the execution of a plurality of processing tasks simultaneously by using multiple cores and/or multi-threading. A processor may include multiple cores and/or multi-threading may provide several logical processors for simultaneously executing and completing the execution of tasks.

A multi-core processor may include multiple processing units within the same processor. In some embodiments, the multi-core processors may share certain resources, such as busses, buffers and first, second or third level of caches. In some instances, each core in a single or multi-core processor may also include multiple executing logical processors. Such a core that supports multiple logical processors may be referred to as a multi-threaded processor. Besides sharing higher level caches and busses, the tasks executing on a multi-threaded processor may also share several stages of the execution pipeline and lower level caches.

Therefore, in a multi-core and/or multi-threaded processor several hardware resources are shared amongst the various tasks executing on the processor. Examples of these hardware resources include several stages of the execution pipeline of a core, several temporary storage buffers, caches and busses.

A malicious task executing simultaneously, or near simultaneously on the processor along with a security sensitive task may be able to deduce security sensitive information from the security sensitive task by performing a behavioral analysis of certain hardware resources shared between logical processors supported by the same processor. For example, in certain instances, it may be possible for the malicious task to infer the parts of the encryption/decryption key being used in the security sensitive task by observing the access patterns of the shared hardware resources by the security sensitive task. Therefore, the malicious task may steal the session key for a secure connection established for a user logged into her bank account through a web browser. Such attacks where a malicious task can steal information for a concurrently running security sensitive task by observing a hardware resource shared by the two tasks may be referred to as a side-channel attack.

Side-channel attacks may be particularly concerning in multi-tenant environments, such as cloud services, where the cloud service provider may schedule the processing of tasks from different tenants (e.g., users) on the same processor. In such an environment, the tasks associated with a tenant may be scheduled as an instantiation of an operating environment within a virtual machine. In certain implementation, a virtual machine is an emulation of the underlying hardware. Executing tasks associated with a tenant in a virtual machine enables a processor to service multiple tenants simultaneously or near simultaneously.

In such an execution environment, a malicious tenant executing a malicious task inside a virtual machine (i.e., malicious virtual machine) may be able to steal secrets from another virtual machine executing security sensitive tasks on the same processor.

In a multi-tenant environment, where multiple tenants or users may concurrently execute tasks on the same computing device, the risk to the security sensitive tasks from potentially executing malicious tasks is exacerbated, since the computing resources of the computing device are no longer dedicated to a single tenant. A multi-tenant environment may refer to an environment where multiple users or accounts, each referred to as a "tenant," may be serviced simultaneously by a computing device and/or the processor of the computing device. For example, in a multi-tenant environment, a processor comprising one or more processing cores and operating in a multi-tenant environment may include one processing core that may simultaneously service instructions associated with two distinct tenants. In some instances, each tenant may be operating as part of a separate virtual machine.

In one instantiation of the side-channel attacks, a virtual machine executing a malicious task simultaneously, or near simultaneously on the processor along with a virtual machine executing a security sensitive task can deduce security sensitive information from the security sensitive task by observing the response time of certain shared hardware resources. Orchestrating a side-channel attack would be significantly more difficult if the malicious tasks or virtual machines visibility into the resources used by the security sensitive task is restricted.

Next, techniques are described for restricting visibility of the malicious task or malicious virtual machine into the shared resources used by the security sensitive tasks. In one aspect, techniques describe assigning an identifier to the security sensitive task from the plurality of tasks; associating a portion of the shared hardware resource (e.g., a way of a cache) with the task identifier; and restricting observability for computer executable instructions executed from the security sensitive task to the portion of the shared hardware resource associated with the security sensitive task identifier.

FIG. 1 illustrates an exemplary execution environment in which virtualization technology is used for performing embodiments described herein. Generally, "virtualization technology" may be used for providing isolation between different operating environments sharing the same physical resources. In other words, virtualization may provide a logical abstraction of computing resources from physical constraints. One common abstraction is referred to as a virtual machine (also known as guest), or VM, which provides the content running in the VM a direct interface to the physical hardware while maintaining the abstraction. Generally, virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing VMs. The VMM usually executes at a higher privilege level than the VMs and manages the system's processor and memory, and allocates other resources for each VM.

FIG. 1 illustrates device hardware 102 executing VMM 104. VMM 104 manages a first VM 106 (VM1) and a second VM 110 (VM2). Device hardware 102 may include one or more processors besides other components for operating a computing system, as described in further detail in FIG. 14 and FIG. 15. In certain implementations, the processors may include hardware support for virtualization technology. For example, INTEL and AMD brand processors provide hardware hooks that support virtualization technology. Qualcomm Incorporated also provides a software abstraction layer which enables multiple operating systems and other clients to execute concurrently on a single processor, through the virtualization and portioning of physical hardware resources. As described above, certain processors may be architected to share hardware resources when possible, for more efficiently utilizing certain hardware components. For example, multiple processing cores may share caches and certain busses on the processor. Furthermore, in some implementations, multiple execution threads may operate on the same thread sharing the execution pipeline and level 1 and level 2 caches.

In FIG. 1, VMM 104 manages VM1 106 executing a first task 108 and VM2 110 executing a second task 112. In some instances, instructions from the first task 108 and the second task 112 may be executing simultaneously. Simultaneously executing two tasks may include concurrently processing at least one executable instruction belonging to the first task 108 and at least another executable instruction belonging to the second task 112, wherein neither of the instructions belonging to the first task and the second task have complete execution.

In one scenario, second task 112 may be a security sensitive task. An example of a security sensitive task may include a task configured to perform encryption operation performed, such as the second task 112, to establish a secure communication channel with a trusted entity, such as a user logging into their bank account. Another example of a security sensitive task may involve the second task 112 encrypting data for safe storage. On the other hand, first task 108 executing in VM1 106 may be a malicious task. As shown in FIG. 1, first task 108 may be configured to spy on the second task 112. In one implementation, the first task 108 may execute a read timer command to measure the response time for certain accesses to shared processor resources such as caches, buffers and/or busses.

In certain embodiments, a task may refer to a group of executable instructions. Example of a task may include a processing thread, a process, or an application that may include multiple processes.

Figure 2:
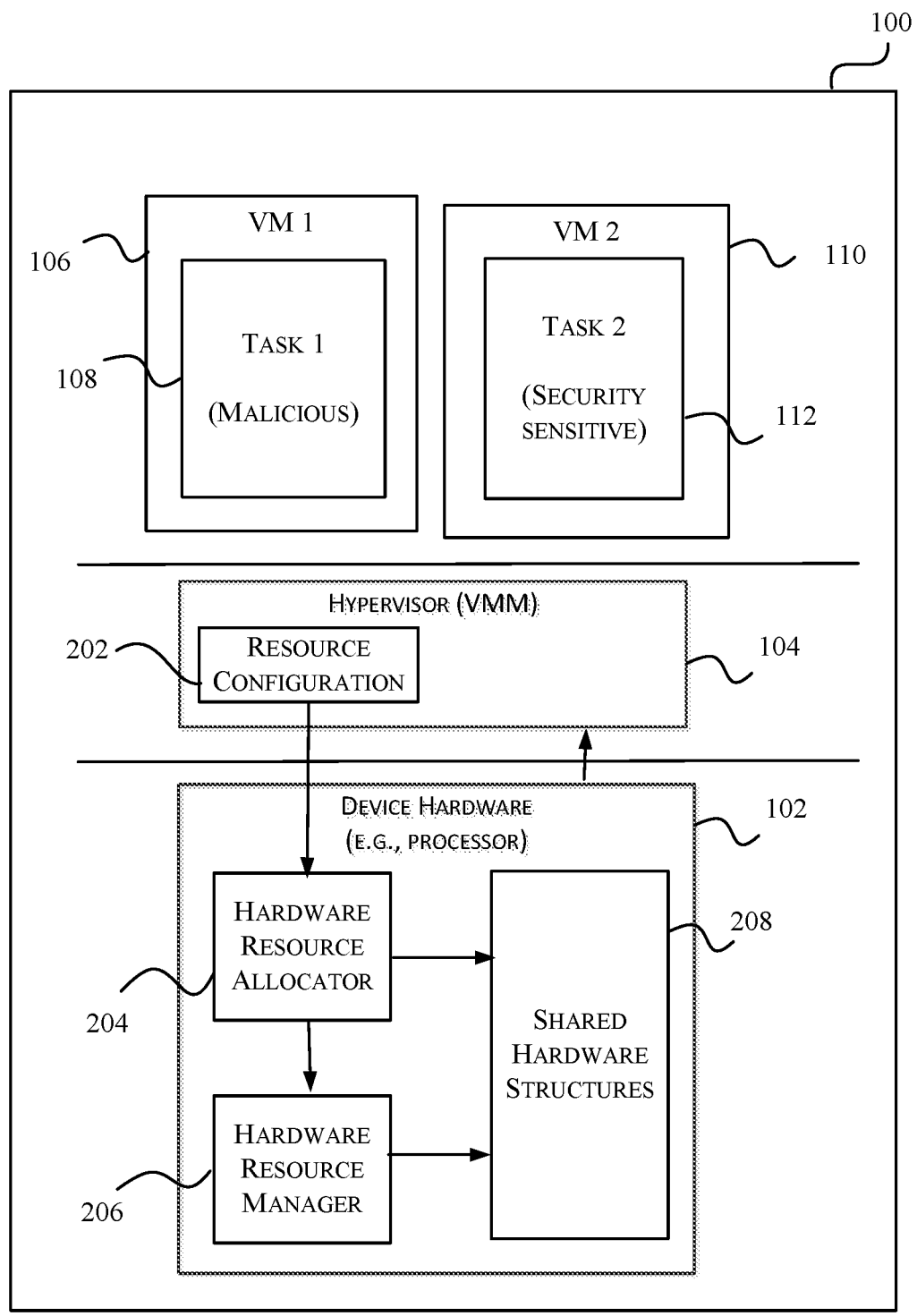
FIG. 2 illustrates a variation of an exemplary execution environment shown in FIG. 1 that is configured to allocate dedicated resources from shared hardware resources to a virtual machine.

FIG. 2 illustrates a variation of the exemplary execution environment shown in FIG. 1 that is configured to allocate dedicated resources from shared hardware resources to a virtual machine. FIG. 2 includes a resource configuration module 202, hardware resource allocation module 204, hardware resource manager module 206 and shared hardware structures 208. In one implementation, the resource configuration module 202 may be implemented in VMM 104 and the hardware resource allocation module 204, hardware resource manager module 206 and shared hardware structures 208 are implemented in the processor (e.g., hardware and/or microcode).

In certain implementations, the resource configuration module 202 may configure the underlying hardware to associate certain portions of the shared hardware structures 208 with a specific VM. For example, in one implementation, the resource configuration module 202 may request dedicated resources for the VM 110 (VM 2) from the shared hardware structures, since the VM 110 (VM 2) is executing a security sensitive task 112. The resource configuration module 202 may allow the VMM 104 to activate and deactivate dedicated allocation of a portion of the shared hardware resources for one or more VMs, The resource configuration module 202 may provide different levels of granularity of control to the VMM 104. For example, the resource configuration module 202 may allow the VMM 104 to enable dynamic and automatic allocation of resources that may be provided by the hardware resource allocator module 204 based on the number of VMs sharing the resource, the number of shared resources, the number of security sensitive VMs, etc. For example, for two VMs executing on a processing core, the hardware resource allocator module 204 may allocate portions of the shared hardware structures 208 differently, than if four VMs were scheduled for executing on the processing core. On the other hand, the VMM 104 may configure the resource configuration module 202 such that the VMM 104 overrides or dictates the fine grained policy for each shared hardware resource 208. Exemplary details of resource configuration module 202 are described with reference to FIG. 6 further below.

The hardware resource allocator module 204 may appropriately allocate or associate certain resources with specific virtual machines. The hardware resource allocator module 204, may use specific configurations, overrides or hints set by the VMM 104, using the resource configuration module 202 in allocating or associating portions of the shared hardware resources. In some instances, the hardware resource allocator module 204 may automatically and dynamically allocate and associate portions of the shared hardware structures 208 for the VMs executing on the processor. For example, the dynamic and automatic allocation of resources may be different for two VMs versus the dynamic and automatic allocation of resources for four VMs. In some instances, the hardware resource allocator module 204 may reconfigure resources associated with a particular VM in runtime to accommodate the changing number of VMs and executing on the processor and various processing load demands for the processor.

In one implementation, the hardware resource allocator module 204 may assign an identifier to the virtual machine from the plurality of virtual machines and associate a portion of the hardware resource with the first identifier. Exemplary details of resource configuration module 202 are described with reference to FIG. 4 further below.

Figure 10:
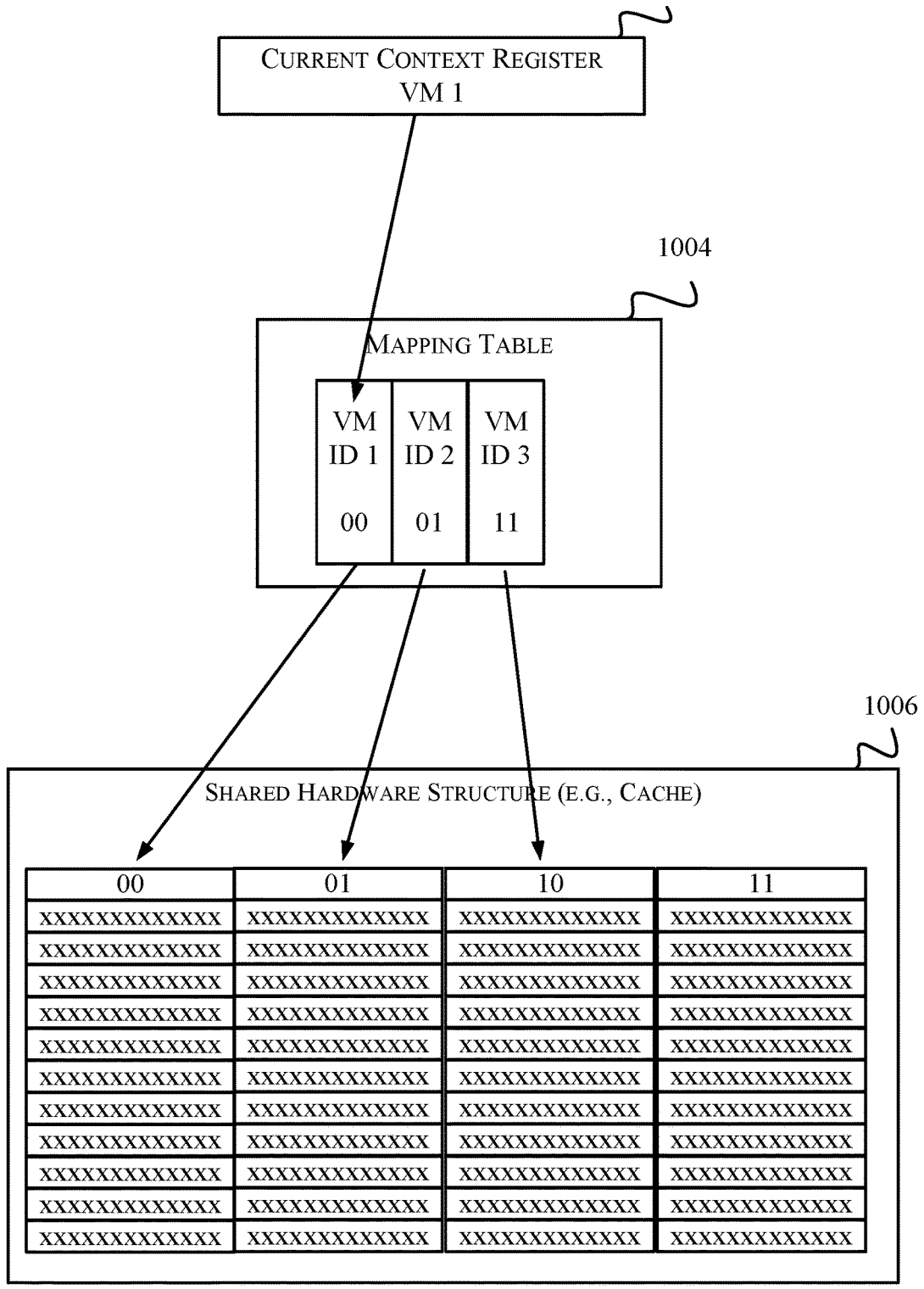
FIG. 10 illustrates another exemplary implementation of a shared hardware structure, according to certain embodiments of the disclosure.
Figure 11:
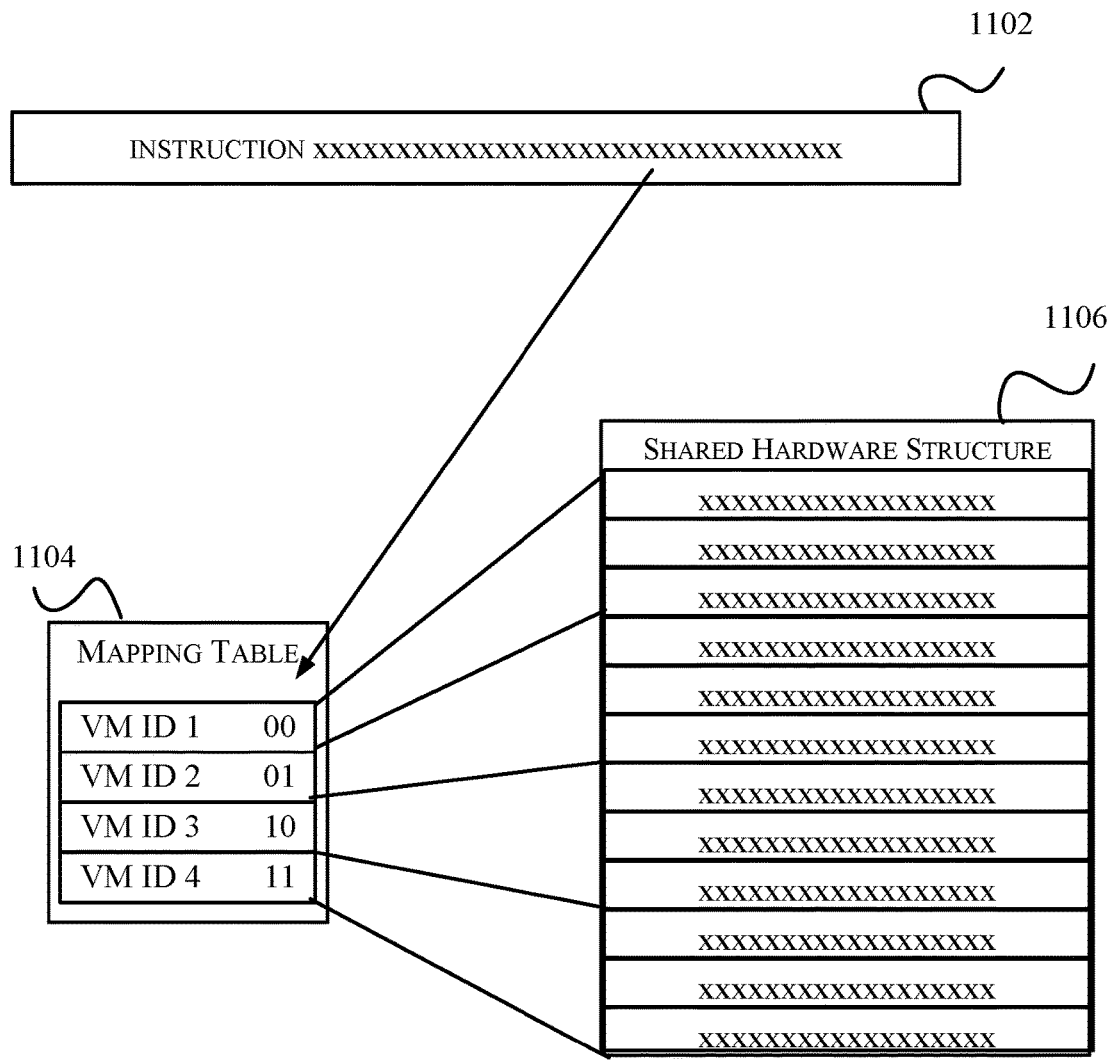
FIG. 11 illustrates another exemplary implementation of a shared hardware resource, according to certain embodiments of the disclosure.

The hardware resource manager module 206 may manage observability and/or access to the shared hardware structures 208. For example, in one implementation, the hardware resource allocator module 204 may generate one or more mapping tables (as shown in FIG. 10 and FIG. 11). The mapping table may provide the mapping between the VMs and the particular shared hardware resources from the shared hardware structures 208. The hardware resource manager module 206 may maintain and use such mapping tables for providing access control. During execution, the hardware resource manager module 206 may provide the appropriate mapping for resource access requests from the VMs. In addition, the hardware resource manager module 206 may also provide certain hardware implemented (e.g., microcode) handlers for handling access to restricted resources during execution of computer executable instructions belonging to a particular VM.

In one implementation, the hardware resource manager module 206 may restrict observability and/or access for computer executable instructions executed from a VM to a portion of the hardware resource from the shared hardware structures 208 associated with an identifier. In another implementation, the hardware resource manager module 206 may restrict access to a portion of the hardware resource associated with an identifier such that the computer executable instructions executed from a particular VM can only access a portion of the hardware resource associated with the identifier from the hardware resource. In yet another implementation, the hardware resource manager module 206, may restrict access to a portion of the hardware resource associated with the identifier such that the computer executable instructions executed from the VM cannot access a portion of the hardware resource associated with identifier from the hardware resource.

Multiple techniques for restricting access to various portions of each hardware resource may be used individually or in combination of each other. In certain implementations, the resource configuration module 202 may configure the policy to be used by the hardware resource manager module 206 to restrict access.

In one implementation, the observability and/or accesses to the shared hardware structures 208 may be handled by the hardware resource manager module 206 implemented in the device hardware 102. The shared hardware structures 208 may provide access to shared hardware resources to multiple executing entities on the processor. For example, for accessing dedicated caches, buffers or other resources for a VM, the access may be handled by the hardware resource manager module 206, without exiting or transferring control to the VMM 104, thus maintaining high level of performance for the computing device. Although, as shown as one module in the figures for ease of illustration, the shared hardware structures 208 may be dispersed throughout the processor and/or the computing system. Shared hardware structures 208 may include hardware resources, such as one or more of a Level 1 cache, a Level 2 cache, a Level 3 cache, Translation Look-aside Buffer (TLB), Write Combining Buffer, Branch Prediction Table, Branch Target Buffer, processor cycles, memory bus access, cache access, I/O access, and network access.

Although, hardware structures are discussed throughout the disclosure, in some embodiments, access to temporal hardware resources, such as processor cycles, memory bus access, cache access, I/O accesses, and network access may also be restricted using techniques described herein. For example, certain VMs may be assigned time-slices for accessing certain shared temporal resources. In some instances, small random delays may be introduced in the access patterns, such that the distribution of access times may not affected by other VMs. Alternatively, the temporal hardware resource may be time-division multiplexed, such that a given VM gets a predictable pattern of time slots, no matter what other VMs are doing.

As described in FIG. 2, by dedicating portions of the shared hardware resources to specific VMs, modules operating within the VMM 104 and/or the device hardware 102 may be able protect security sensitive VMs from side channel attacks launched from malicious VMs running simultaneously on the same computing system.

Figure 3:
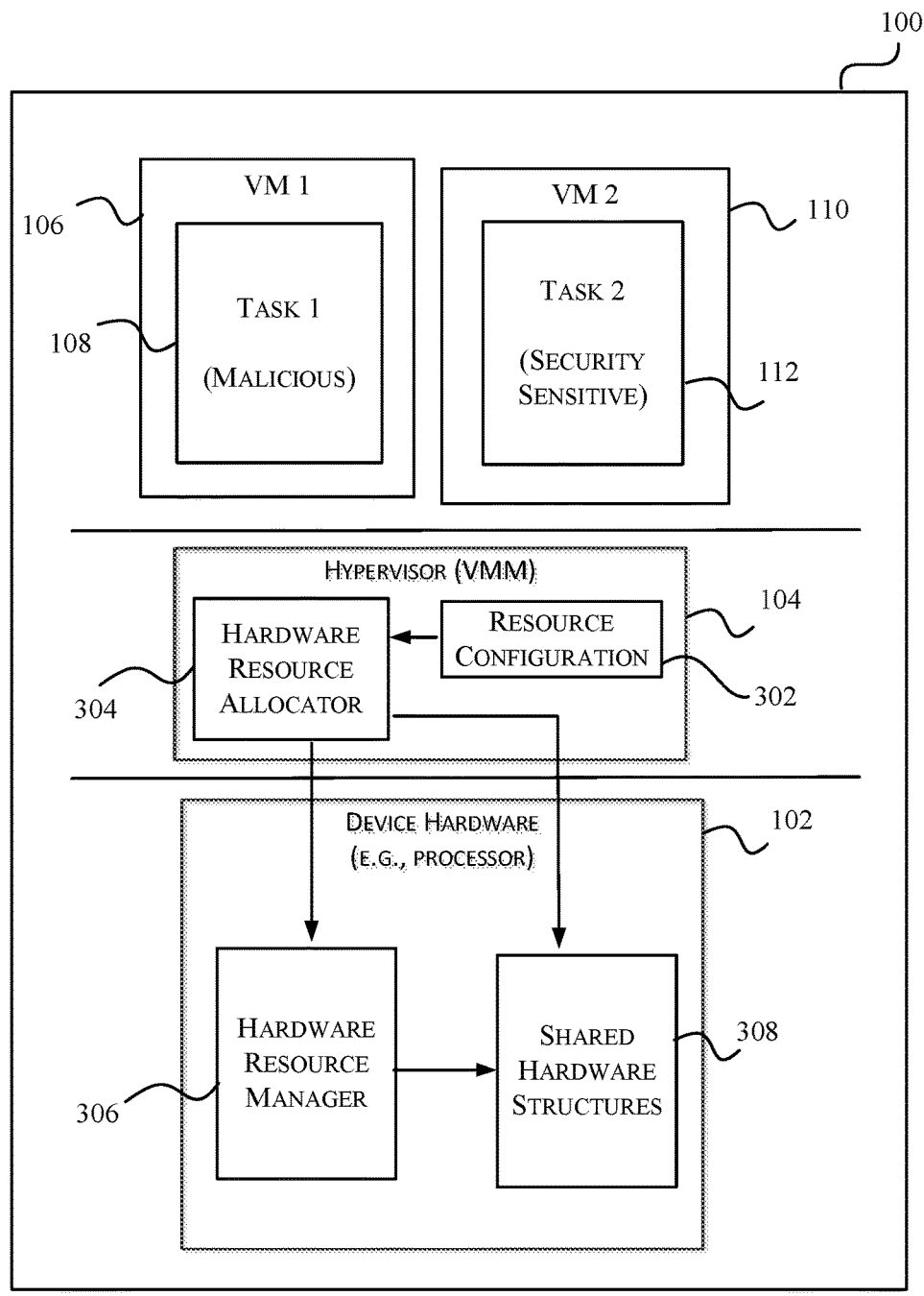
FIG. 3 illustrates another variation of an exemplary execution environment shown in FIG. 1 that is configured to allocate dedicated resources from shared hardware resources to a virtual machine.

FIG. 3 illustrates another variation of the exemplary execution environment shown in FIG. 1 that is configured to allocate dedicated resources from shared hardware resources to a virtual machine. As shown in FIG. 3, at least a portion or all of the hardware resource allocator module 304 may be implemented in the VMM 104, rather than in the device hardware 102.

Similar to what has been described with reference to FIG. 2, the access controls for resources for the VMs may be configured by VMM 104 via the resource configuration module 302. The hardware resource allocator module 304 may receive input from the resource configuration module 302 to allocate and/or associate the VMs with specific portions of the shared hardware structures 308. The resource configuration module 302 may be similar to the resource configuration module 202 of FIG. 2, with a few variations for interacting with the hardware resource allocator module 304 implemented in the VMM 104. Exemplary details of resource configuration module 302 are described with reference to FIG. 6 further below.

Implementing the hardware resource allocator module 304 in the VMM 104 may allow the user or the VMM 104 vendor with greater control of how the shared hardware structures 208 are configured and allocated. For example, different variations of the hardware resource allocator module 304 may be provided for different uses cases. For instance, the hardware resource allocator module 304 may be different for a VMM 104 executing on a cloud service provider server rather than the hardware allocator module 304 for a VMM 104 executing on a workstation computer in an office. Exemplary details of hardware resource allocator module 304 are described with reference to FIG. 4 further below.

Similarly, the hardware resource manager module 306 and the shared hardware structures 308 may be functionally similar to the hardware resource manager module 206 and the shared hardware structures 208. However, the hardware resource manager module 306 and the shared hardware structures 308 may be different, in that they may expose an interface to the VMM 104 for directly interacting and configuring portions of the respective modules. Exemplary details of the hardware resource manager module 306 are described with reference to FIG. 5.

Figure 4:
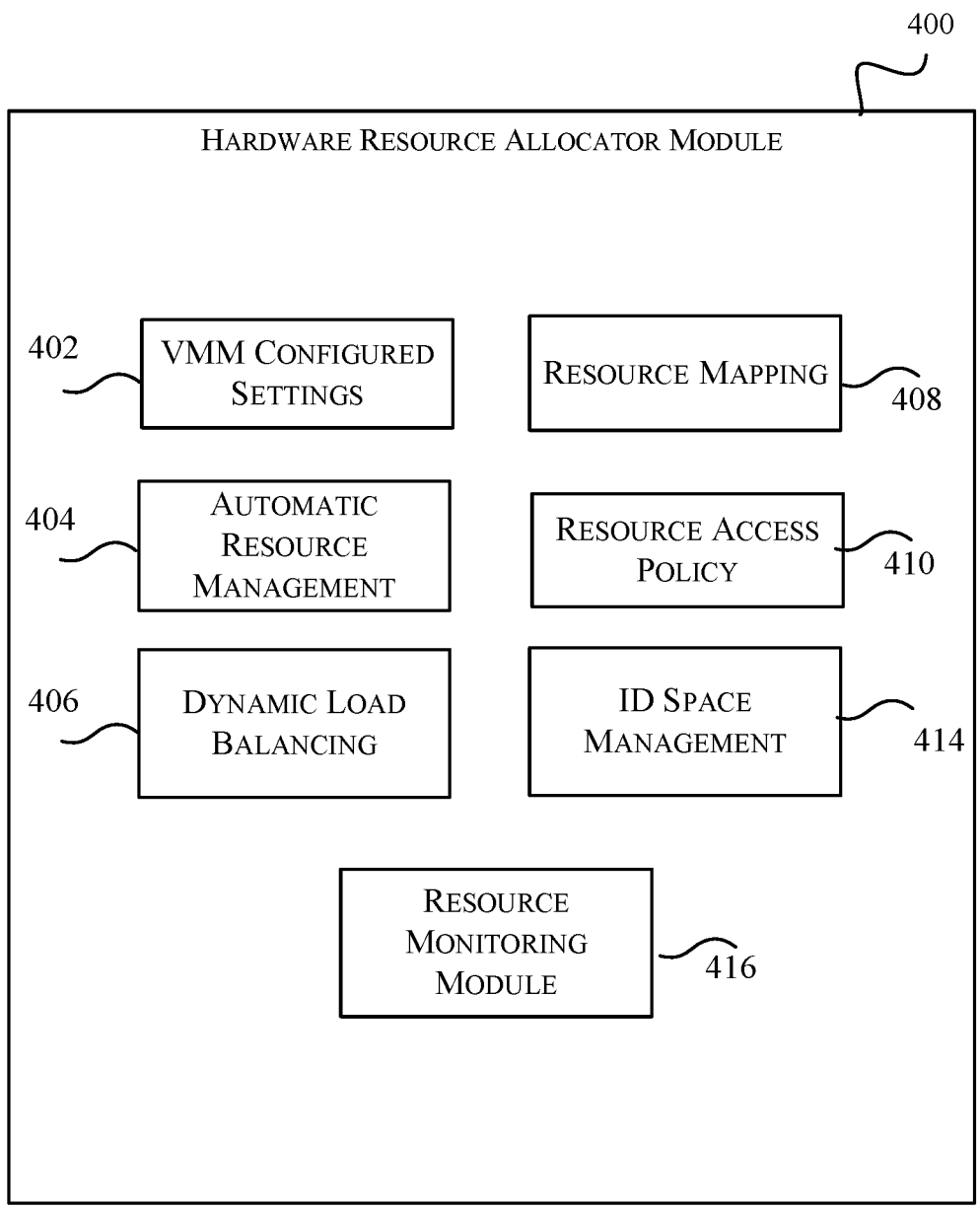
FIG. 4 is a block diagram illustrating exemplary aspects of a hardware resource allocation module, according to certain embodiments of the disclosure.

FIG. 4 is a block diagram illustrating exemplary aspects of the hardware resource allocation module, according to certain embodiments of the disclosure. Hardware resource allocation module 500 may be implemented as the hardware resource allocation module 204 in FIG. 2 or the hardware resource allocation module 304 in FIG. 3, or any combination thereof. Furthermore, VMM configured settings module 402, automatic resource management module 404, dynamic load balancing module 406, resource mapping module 408, resource access policy module 410, ID space management module 414 and resource monitoring module 416 may be implemented in hardware, software, firmware (e.g., processor microcode) or any combination thereof.

The hardware resource allocator module 400 may appropriately allocate or associate certain hardware resources, such as portions of the shared hardware structures 208 with specific VMs. The hardware resource allocator module 204, may use specific configurations, overrides or hints provided by the VMM 104, using the resource configuration module 600 in allocating or associating portions of the shared hardware resources. In some instances, the hardware resource allocator module 400 may automatically and dynamically allocate and associate the shared hardware resources for the VMs executing on the processor. In some instances, the hardware resource allocator module 400 may reconfigure resources associated with a particular VM in runtime to accommodate for changing number of active VMs or tasks associated with the processor.

Figure 6:
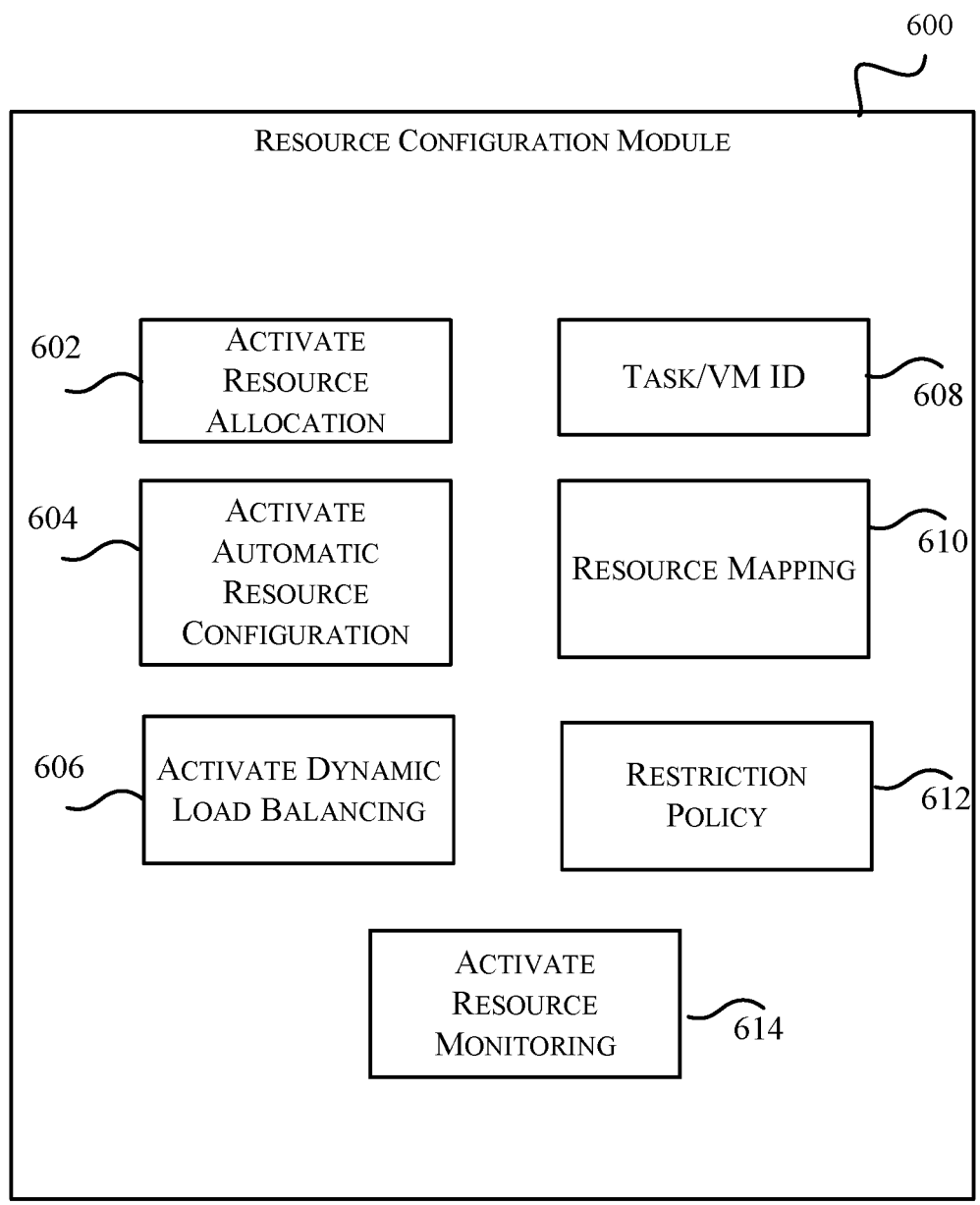
FIG. 6 is a block diagram illustrating exemplary aspects of a resource configuration module, according to certain embodiments of the disclosure.

The hardware resource allocator module 400 may receive values from resource configuration module described in further detail in FIG. 6 at the VMM configured settings module 402. The configurations received at the VMM configured settings module 402 may activate resource allocation features and determine or override several features or configurations for the hardware resource allocator module 400. The VMM configuration settings module 402 may disseminate the different configuration values received from the resource configuration module 600 (via VMM 104) to the appropriate modules in the hardware resource allocator module 400. In some instances, the configuration values from the resource configuration module may be received via hardware registers, memory locations or memory pointers by the VMM configured settings module 402 in the hardware resource allocator module 400.

Automatic resource management module 404 may allow for automatic resource configuration and allocation of shared hardware resource, based on example considerations such as the number of VMs and resources available. In certain instances, the resource configuration module described in further detail in FIG. 6 may activate the automatic resource management module 404. In other implementations, the automatic resource management module 404 may be activated to automatically configure the resources associated with VMs once the resource allocation features are enabled. If the functions performed by the automatic resource management module 404 are deactivated by the resource configuration module 600, the VMM 104 may manually reconfigure and associate certain VMs with certain resources associated with certain portions of the shared resources using configuration options in the resource configuration module 600.

Dynamic load balancing module 406 may dynamically rebalance the resources associated with any particular VM. In one example, a processing core may be enabled to run two VMs at a first time. In this scenario, in one implementation, the first VM may be allocated one/third the resources of a shared hardware structure, such as a cache and the second VM may be allocated one/third the resources of the shared hardware structure, leaving about one/third of the shared hardware structure as a resource for the VMM and other miscellaneous tasks. However, if at a later point in time the total number of VMs increase to four VMs from two VMs, the device hardware 102 may be configured to dynamically load balance the usage of the shared hardware resources 208/308. For example, the allocation of the shared hardware structure for the first VM may go down from one/third of the shared hardware structure to one/fifth to accommodate for the additional VMs.

In certain implementations, dynamic load balancing may be performed for both active VMs and VMs that are not currently active but are scheduled for execution on the processing core. In other implementations, dynamic load balancing may be performed only for active VMs executing on a processing core. For example, in one implementation, where a processing core may have multiple processing threads executing simultaneously on the same processing core and sharing hardware structures, such as caches, embodiments described herein may appropriately allocate resources for each of the active VMs associated with each of the currently executing processing threads. In other implementations, each processing thread of each processing core may maintain several active VMs and their cached state for fast switching between multiple VMs and therefore may be configured to enable dynamic load balancing using the dynamic load balancing module 406.

Resource mapping module 408 may be configured to generate a mapping or indication for the mapping of the VMs to certain portions of the shared hardware structures 208/308. For example, in FIGS. 1-3, for VM 110 (VM 2), executing a security sensitive task 112, the VMM 104 may indicate to the underlying hardware to reserve a first way of a cache for VM 110 (VM 2), such that all cache access performed by the VM 110 (VM 2) are serviced by the first way of the cache, and that access requests from other VMs do not result in successful responses to the first way reserved for the VM 110 (VM 2).

Resource access policy module 410 may provide policy for the access restrictions associated with portions of the shared hardware resources for specific VMs. For example, in one implementation, a specific portion of the shared hardware structure may be associated with a specific VM ID (via, resource mapping). However, the access policy for the access by the instructions from the VM associated with the VM ID may be based on the selection from the resource access policy module 410.

In one implementation, a VM may be configured so that the VM can only access portions of the shared hardware resources associated with the VM. For example, referring to FIG. 3. 1-3, the VMM 104 may want to protect the resources associated with VM 110 (VM 2) executing a security sensitive task 112. In such a scenario, VMM 104 may associate specific resources with VM 110 (VM 2), using the resource mapping module 410. Additionally, the VMM 104 may select the restriction policy such that all accesses from the VM 110 (VM 2) are restricted to the specific resources assigned to VM 110 (VM 2). Furthermore, other VMs or tasks executing on the processor may not be allowed to access the resources assigned to VM 110 (VM 2).

In another implementation, based on the policy selected in the resource access policy module 410, associating a VM with a resource may result in the VM prohibited from accessing the resources associated with the VM. For example, referring again to FIGS. 1-3, the VMM 104 may determine that the VM 106 (VM 1) is executing a malicious or misbehaving task, and may associate VM 106 (VM 1) with specific resources, such that the VM 106 (VM 1) cannot access the specified resources. In one instance, the specified resource may be a shared hardware resource from a shared hardware structure that may be in use by one or more well behaved VMs executing on the processor.

In yet another implementation, the policy from the resource access policy module 410 may be configured such that a VM may access portions of the shared hardware resources associated with the VM and all or most of the other portions of the shared hardware resources. The association between the VM and the portion of the shared hardware structure may be to restrict other VMs or tasks from accessing the resources associated with the VM.

The ID space management module 414 may manage the usage of the VM IDs in a system where a mapping may exist between the VMs and the shared hardware resources. In a multi-socket or multi-core system, the ID space management module 414 may use a large enough address space, such that the invalidation of a used VM ID may be deferred for a significantly long period to avoid frequent inter-processor interrupts to invalidate VM IDs and synchronize the ID space amongst multiple sockets. This may allow amortization of the time cost associated with synchronizing the VM ID set amongst the various processing entities on the system.

In some instances, the ID space management module 414 may assign an identifier to a portion of the hardware resource and associate or provide a mapping between the VM ID of the VM and the portion of the shared hardware structure 208. In other implementations, ID management module 414 may directly tag the portion of the hardware resource with the VM ID.

The hardware resource allocator module 400 may also implement a resource monitoring module 416. The resource monitoring module 416 may enable the underlying hardware for monitoring overall consumption of resources by any particular VM or task. The resource monitoring module 416 may configure certain performance counters provided by the device hardware 102. In one implementation, the resource monitoring module 416 may activate resource allocation and initiate automatic or pre-configured allocation of resources based on the resource consumption or events monitored for a specific VM. For example, in FIGS. 1-3, if the VM 106 (VM 1) started flooding the caches continually with data, the resource monitoring module 416 may detect such a condition and automatically activate resource allocation features for the VM 106 (VM 1), such that the accesses by the VM are restricted in space and resources. Detecting such changes and/or monopolization of resources by any given VM may allow the resource monitoring module 416 to not only monitor, but also curtail any potentially disruptive or malicious behavior by misbehaving/malicious VMs.

Figure 5:
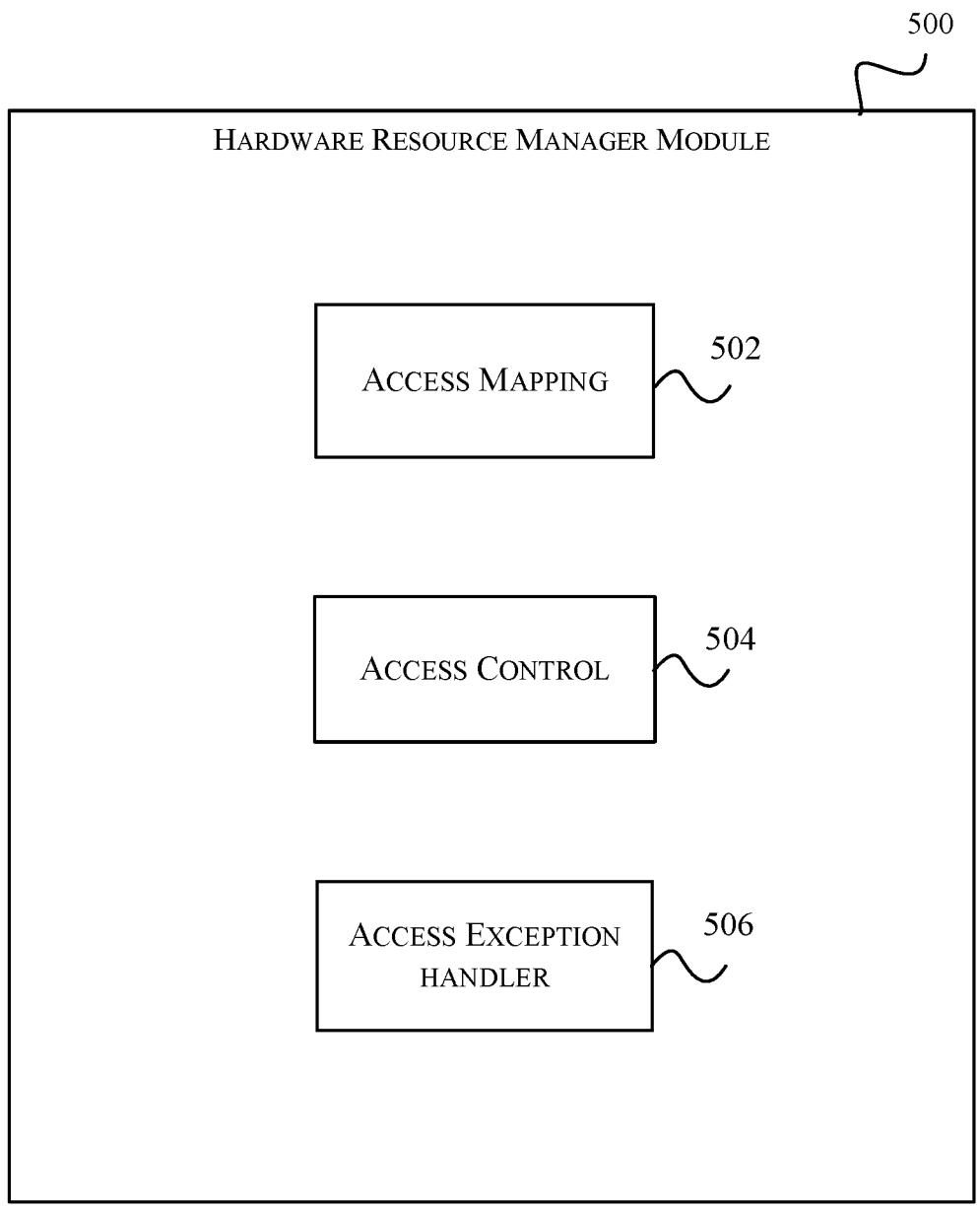
FIG. 5 is a block diagram illustrating exemplary aspects of a hardware resource manager module, according to certain embodiments of the disclosure.

FIG. 5 is a block diagram illustrating exemplary aspects of the hardware resource manager module, according to certain embodiments of the disclosure. Hardware resource manager module 500 may be implemented as the hardware resource manager module 206 in FIG. 2 or the hardware resource allocation module 306 in FIG. 3, or any combination thereof. Furthermore, access mapping module 502, access control 504 and access exception handler 506 may be implemented in hardware, software, firmware (e.g., processor microcode) or any combination thereof.

Access mapping module 502 may maintain one or more mapping tables (as shown in FIG. 10 and FIG. 11) accessible by the hardware resource manager module 206. The mapping tables may associate the VM IDs and portions of the particular shared hardware resources from the shared hardware structures 208/308. In some implementations, the access mapping module 502 may maintain the mapping tables in system memory. In other implementations, the access mapping module 502 may cache some or all of the entries from the mapping tables in the processor for fast access by components of the hardware resource manager module 206, such as the access control module 504.

In some instances, the access control module 504 may manage access to the shared hardware structures 208/308 using information stored and maintained by the access mapping module 502. During execution of instructions from the various VMs the access control module 504 may provide the appropriate mapping for access request based on the originating VM for the computer executable instruction making the request.

In one implementation, the access control module 504 may restrict access for computer executable instructions executed from the VM to the portion of the hardware resource from the shared hardware structures 208/308 associated with an VM identifier.

In another implementation, the access control module 504 may restrict access to the portion of the hardware resource associated with the VM identifier such that the computer executable instructions executed from the virtual machine can only access the portion of the shared hardware resource associated with the VM identifier.

In yet another implementation, the access control module 504 may restrict access to the portion of the shared hardware resource associated with the VM identifier such that the computer executable instructions executed from the virtual machine cannot access the portion of the hardware resource associated with VM identifier from the hardware resource.

Multiple techniques for restricting access to various portions of each hardware resource may be used individually or in combination with each other. In certain implementations, the resource configuration module 202 may configure the policy to be used for restricting access by the access control module 504.

Access exception handler 506 may provide certain hardware implemented (e.g., microcode) handlers for handling access to restricted resources during the execution of instructions belonging to a particular VM. In some instances, the access exception handler 506 may transfer control to the VMM 104 for a VM operation and provide the VMM 104 with additional information regarding the access request by the VM. In certain instances, the VMM 104 may evaluate if the VM access was malicious and/or detrimental to the operating of the computing device and take further remedial steps, such as terminate or further restrict access by the VM.

FIG. 6 is a block diagram illustrating exemplary aspects of the resource configuration module, according to certain embodiments of the disclosure. Resource configuration module 600 may be implemented as part of VMM 104, as discussed with reference to FIG. 2 and FIG. 3. In certain instances, even though the resource configuration module may be implemented as part of the VMM 104, the resource configuration module 400 may access certain hardware resources, such as configuration registers provided by the device hardware 102, such as the processor (hardware or microcode), or any combination thereof.

Furthermore, activate resource allocation module 602, activate automatic resource configuration module 604, activate dynamic load balancing 606, task/VM ID module 608, resource mapping module 610, restriction policy module 612 and activate resource monitoring module 614 may all be implemented in software or in conjunction with certain features implemented in hardware, software, firmware (e.g., processor microcode) or any combination thereof. Resource configuration module 600, using one or more modules above, may provide the configuration for allocating resources to a VM from a shared hardware structure 208/308.

In some implementations, the resource configuration module 600 may provide an interface for programming mechanisms, features and configurations provided by several modules and components of the processor (hardware or microcode), such as the hardware resource allocator module 400 and the hardware resource manager module 500. For example, in one implementation, the processor may provide the configuration registers for enabling/disabling dynamic allocation of shared hardware resources, performance monitoring of certain tasks/VMs, dynamic load balancing, etc. in VMM 104 for programming such configuration parameters.

In certain implementations, the resource configuration module 600 may configure the underlying hardware to associate certain portions of the shared hardware structures 208/308 with a specific VM. For example, in one implementation, the resource configuration module 600 may request dedicated resources for VM 110 (VM 2), since VM 110 (VM 2) may be executing a security sensitive task 112. The resource configuration module 600 may provide different levels of granularity of control to the VMM 104 for controlling the allocation of resources to specific VMs.

Activate resource allocation module 602 may activate or deactivate the resource allocation feature. Activate resource allocation module 602 may provide a combination of settings to activate or deactivate the resource allocation feature globally for the processor, and/or on a per core, per thread, a per task and/or per VM basis. For example, activate resource allocation module 602 may set one or more activate bits in one or more configuration registers provided by the processor to activate the allocate resource feature and clear the one or more activate bits to deactivate the allocate resource feature. Several such configuration bits may be provided for activating or deactivating the resource allocation feature on various different granularities.

Activate automatic resource configuration module 604 may provide the automatic resource management module 404 implemented as part of the hardware resource allocator module 400 a hint to allow for automatic resource configuration and allocation of shared hardware resource, based on example considerations such as the number of VMs and resources available. In instances where the VMM 104 may disable automatic resource configuration in the activate automatic resource configuration module 604, the VMM 104 may provide the resource mapping using the resource mapping module 610 and the restriction policy module 612 in the hardware resource allocator module 600.

Activate dynamic load balancing module 606 may provide the dynamic load balancing module 406 implemented as part of the hardware resource allocator module 400 a hint to allow for dynamic load balancing of shared hardware resources. Dynamic load balancing, as described in FIG. 4, may allow for rebalancing of resources associated with the VM based on the changing processing demands for the computing system.

In certain aspects, Task/VM ID module 608 may identify the task and/or VM to activate the resource allocation feature for. For example, referring to FIGS. 1-3, VMM 104 may configure Task/VM ID module 608 to identify and activate the resource allocation feature for VM 110 (VM 2). The determination of activating the resource allocation feature may be based on the trust associated with any particular VM. For instance, VMM 104 may choose to activate the resource allocation feature for a secure and trusted VM 110 (VM 2), so that VM 110 (VM 2) has dedicated resources from the shared hardware structures 208 that the other VMs or tasks cannot spy on.

In certain other implementations, a group ID may be used by the Task/VM ID module 608 for identifying and activating the resource allocation feature for a plurality of VMs or Tasks. For example, in one implementation, a mask may be used to select a group of VMs or Tasks.

In certain implementations, in instances where automatic resource configuration 604 may be deactivated, the resource mapping module 410 may be configured to provide the VMM 104 with an interface for providing a mapping or indication for the mapping of the VMs to certain portions of the shared hardware structures 208/308. Changes to the mapping by the resource mapping module may result in updates to the access mapping module 502 in the hardware resource manager module 500.

In certain aspects, the restriction policy module 612 may provide policy for the access restrictions associated with shared hardware resources for any VM. For example, in one implementation, a specific portion of the shared hardware structure may be associated with a specific VM ID (via resource mapping module). However, the access policy for access by the computer executable instructions from a VM associated with the VM ID may be based on the policy provided by the restriction policy module 612. In one implementation, a VM may only access the portions of the shared hardware resources associated with the VM. In another implementation, based on the policy selected in the restriction policy module 612, associating the VM with the resource may result in the VM prohibited from accessing the resources associated with the VM.

In some instances, the access policy for the access restrictions selected in the restriction policy module 612 may update the access control module 504 in the hardware resource manager module 500.

In certain aspects, the resource configuration module 600 may allow the VMM 104 to activate resource monitoring via the activate resource monitoring module 614. The activate resource monitoring module 614 may activate resource monitoring using performance monitors in the resource monitoring module 416 in the hardware resource allocation module 400. Activating resource monitoring may enable the underlying hardware to monitor overall consumption or gather information regarding specific events for the resource consumption by any particular VM or task and appropriately take action for misbehaving VMs or tasks.

Figure 7:
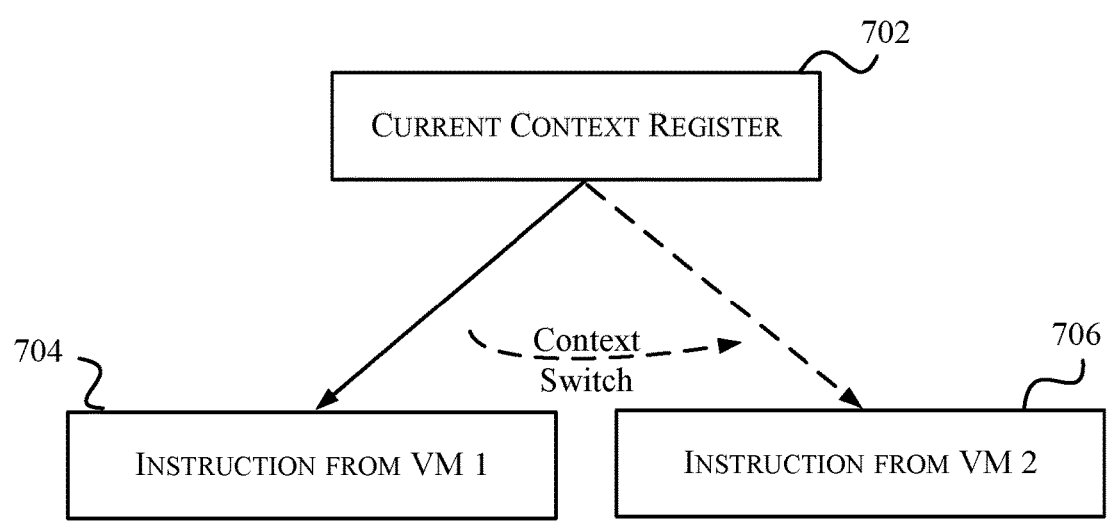
FIG. 7 is a block diagram illustrating an exemplary implementation of associating context with a computer executable instruction, according to certain embodiments of the disclosure.

FIG. 7 is a block diagram illustrating an exemplary implementation of associating context with a computer executable instruction, according to certain embodiments. As described herein, the access control policies for an instruction belonging to a first VM 704 may be different from the access control policies for an instruction belonging to a second VM 706. In one implementation, the mapping or association of the VM with portions of the shared hardware structure 208 may be based on the mappings maintained by the access mapping module 502 of the hardware resource manager module 500. The access control policy may be reflected in the access control module 504 of the hardware resource manager module 500.

As shown in FIG. 7, in one implementation, the processor may maintain the current context associated with the active VM in a current context register 702. In some implementations, the current context may be maintained for each processing thread on the processor. The current context register 702 may associate the executing instructions for the processing thread or core with an active VM. In certain implementations, based on the contents of the current context register 702, the access control module or the shared hardware structure 208 may restrict/allow access to certain portions of the shared hardware structures 208, using techniques described herein.

In certain implementations, switching the execution between one VM to another VM may be implemented as a serializing event, such that all computer executable instructions before the switch occurs (i.e., all the instructions belonging to the VM prior to the switch) are completed and/or flushed from the processor pipeline before the new instructions from the newly loaded VM start executing. Implementing the VM switch as a serializing event ensures that instructions from the VM after the VM switch do not gain access to the shared hardware resources associated with the VM prior to the VM switch.

Figure 8:
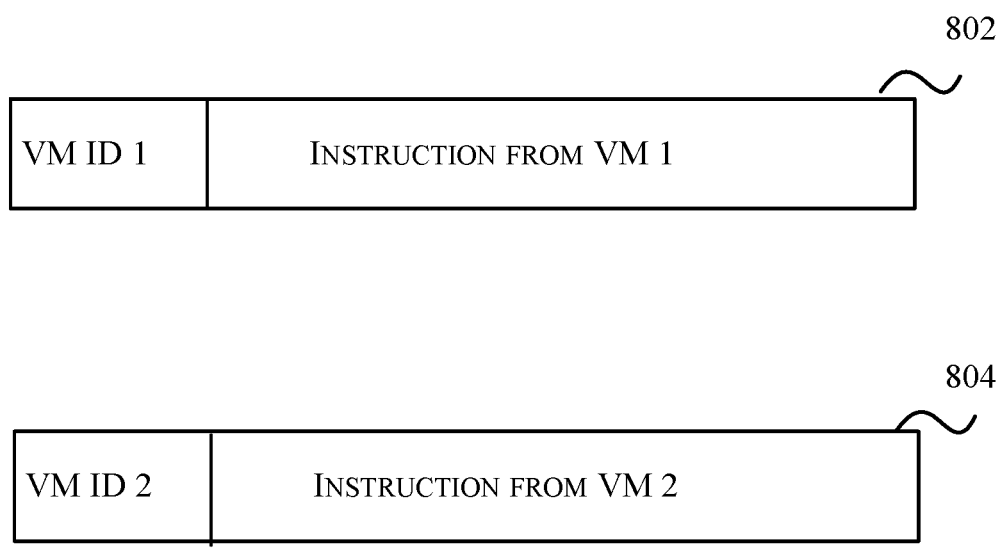
FIG. 8 is another block diagram illustrating an exemplary implementation of associating context with a computer executable instruction, according to certain embodiments of the disclosure.

FIG. 8 is another block diagram illustrating an exemplary implementation of associating context with a computer executable instruction, according to certain embodiments. As shown in FIG. 8, each instruction may be tagged with the VM ID that the computer executable instruction is associated with. For example, as shown in block 802, the instruction from the VM 106 may be tagged with VM ID 1, and as shown in block 804, the instruction from the VM 110 may be tagged with VM ID 2. In certain implementations, the instructions may be tagged at any of various stages of the processor pipeline, such as fetch and/or decode stages of the processing pipeline.

In such implementations, the shared hardware structure 208/308 may include logic to check if portion of the shared hardware structure is associated with the VM ID tagged to the computer executable instruction requesting information. In other implementations, the access control module 504 may determine the access restrictions for a give instruction based on the tag associated with the instruction.

In certain implementations, a combination of techniques may be used in determining the VM an instruction belongs to for the purposes of allowing access to certain portions of a shared hardware structure 208/308. In one example scenario, as described in FIG. 7, the current context register 702 may provide the VM association for the instructions. However, for certain instructions with long latencies, the processor may tag the instruction with the VM ID and allow the instruction to continue completion even after the serializing event (i.e., switch from one VM to another VM).

Figure 9:
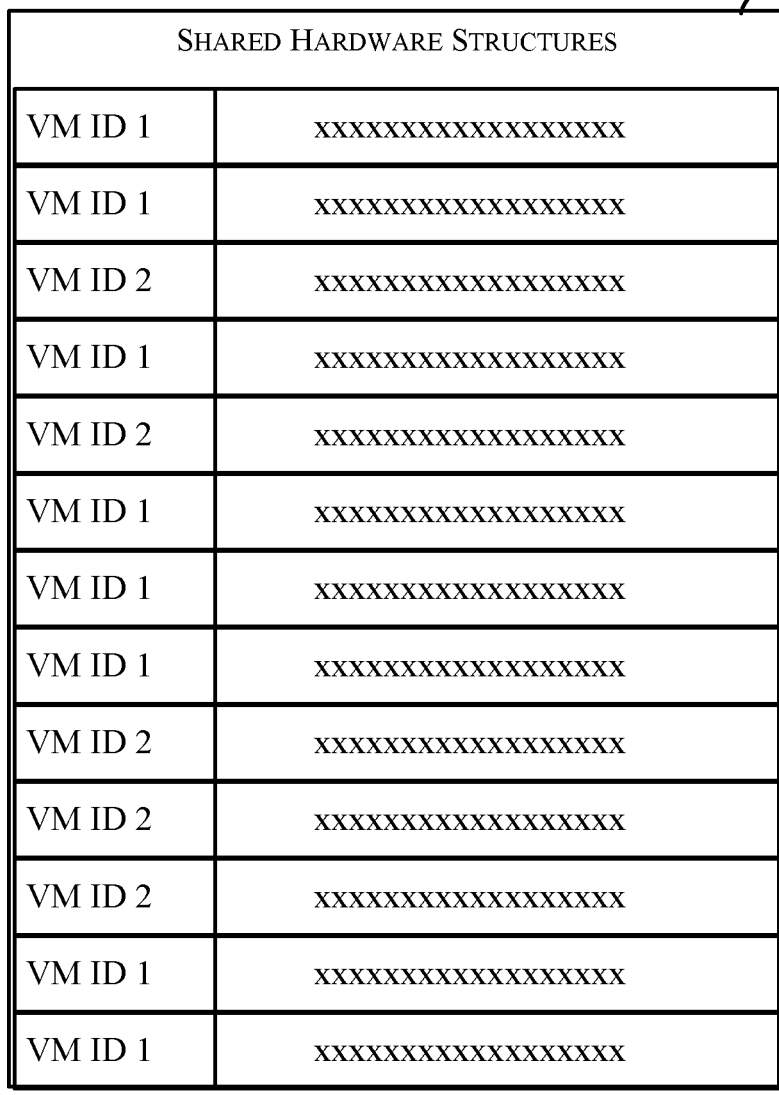
FIG. 9 illustrates an exemplary implementation of a shared hardware structure, according to certain example embodiments of the disclosure.

FIG. 9 illustrates an exemplary implementation of a shared hardware structure, according to certain example embodiments. The shared hardware structure 900 from FIG. 9 may represent one implementation of the shared hardware structures (208 and 308) represented in FIG. 2 and FIG. 3. In FIG. 9 several lines of data are depicted, wherein each data line is tagged with a VM ID. For example, in FIG. 9, some of the lines are tagged with VM ID 1 and others are tagged with VM ID 2. In one implementation, the shared hardware structure may have logic for determining the VM the access request belongs to. For example, the checking logic in the shared hardware structure 900 may check the current context register 702 (as described in FIG. 7) or the tag associated with the access request (as described in FIG. 8) to determine the VM the access request originates from. In one implementation, under a specific access policy, if the access request originates from a VM with VM ID 1 and the access request requests access to a line tagged with VM ID 1, the access to the line may be granted. On the other hand, if the access request originates from a VM with VM ID 1 and the access request requests access to a line tagged with VM ID 2, the access to the line may be denied. In one implementation, an access exception may be generated in response to an invalid or illegal access request and handled by the access exception module 506 of the hardware resource manager module 500.

FIG. 10 illustrates an exemplary implementation of a shared hardware structure, according to certain embodiments of the disclosure. The shared hardware structure 1000 from FIG. 10 may represent one implementation of the shared hardware structures (208 and 308) represented in FIG. 2 and FIG. 3. FIG. 10 illustrates an example shared hardware structure, such as a 4-way cache 1006. Generally, an access request for a line in the cache 1006 may result in an access to a line residing at any one of the ways of the cache, based on the cache eviction policy. In certain aspects of the disclosure, certain ways of the cache may be reserved for specific VMs.

In certain implementations, the VMM 104 via the resource configuration module 600 may request resource allocation and management for the VM 110 (VM 2). In one implementation, the resource mapping module 408 may generate the mapping for the VM, using a mapping table 1004. In certain aspects, the mapping table 1004 may be maintained by the access mapping module 502 of the hardware resource manager module 500.

As shown in FIG. 10, the access control module 504 may use the current context register 702 in determining the current executing VM and associate the reserved way of the cache that may be used by the computer executable instructions executing in the current context. In some implementations, the current context may be cached in the shared hardware structure or a temporary buffer quickly accessible to the shared hardware structure to expedite determining the access restrictions. As shown in FIG. 10, the current context register 702 may have a VM ID for the VM 106 (VM 1) that may translate to the first way of the cache 1006, using the mapping table 1004.

FIG. 11 illustrates another exemplary implementation of a shared hardware resource, according to certain embodiments of the disclosure. The shared hardware structure 1100 from FIG. 11 may represent one implementation of the shared hardware structures (208 and 308) represented in FIG. 2 and FIG. 3. For example, the shared hardware structure may be a branch prediction buffer, or a table look aside buffer or any other buffer. In FIG. 11, in certain implementations, a computer executable instruction accessing shared hardware structure 1106 and originating from a VM may be associated with a portion of the shared hardware structure using a mapping table 1104. The mapping table may associate the VM ID with a secondary ID that may be used to statically or semi-statically segment the shared hardware structure 1106 into multiple portions. As discussed previously, the current context for the VM may be accessed from the current context register 702 or a tag associated with the computer executable instruction or any other suitable method. The mapping table may be maintained by the access mapping module 502 of the hardware resource manager module 500.

Figure 12:
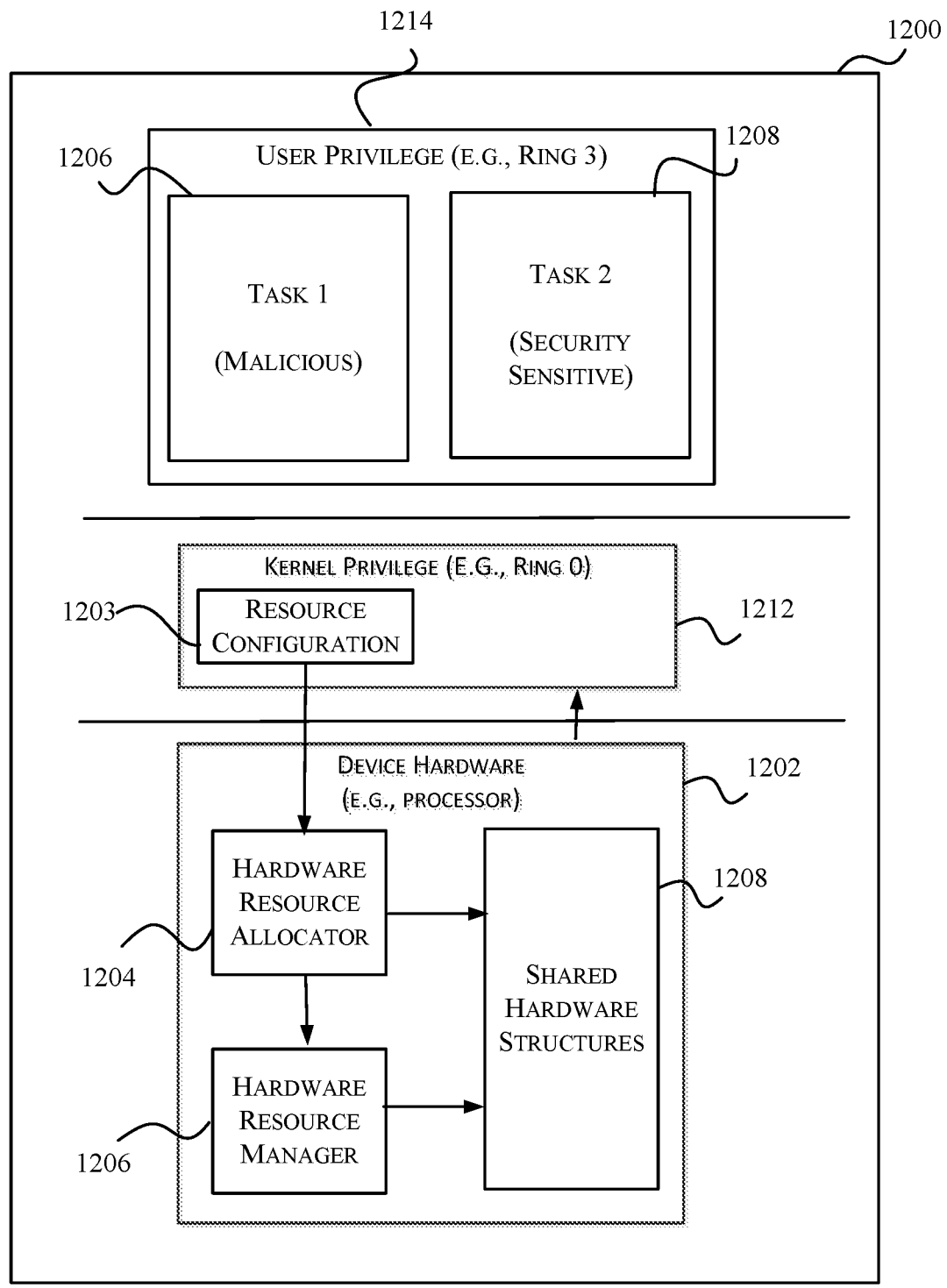
FIG. 12 is a block diagram illustrating techniques for providing dedicated resources from shared resources to a task, according to certain embodiments of the disclosure.

FIG. 12 is a block diagram illustrating techniques for allocating portion of a shared hardware resource to a task instead, according to certain embodiments of the disclosure. Although in FIGS. 1-11 aspects of the disclosure have been described with respect to virtualized environments, embodiments described herein are not limited to such an environment.

FIG. 12 illustrates device hardware 1202 executing privileged code in kernel privilege 1212. Device hardware 1202 may include one or more processors, besides other components for operating a computing system. In certain implementations, the processors may provide hardware support for allocating portions of the shared hardware structures to specific tasks and managing such allocations. Examples of such processors may include but are not limited to Intel®, Qualcomm® and AMD® processors. Similar to what has been discussed before, for example, with reference to FIG. 1, certain processors may be architected to share hardware resources, when possible, for more efficiently utilizing certain hardware components. For example, multiple processing cores may share caches and certain busses on the processor. Furthermore, in some implementations, multiple execution threads may operate on the same processor sharing the execution pipeline and level 1 and level 2 caches. Such sharing of hardware resources between tasks operating on the processor may enable side-channel attacks by a malicious task to retrieve sensitive information from a task executing or that may include sensitive information.

In certain implementations, privileged code/binary executing at kernel privilege 1212 may include operating system code/binary running at very high privilege levels on the device hardware. In certain aspects, the level of privilege may determine the level of direct access and control of the hardware resources. Traditionally, the kernel of the operating systems and drivers operate at kernel privilege level 1212 (e.g., Ring 0 privilege level), and tasks such as applications and processes operate at user privilege level 1214 (e.g., Ring 3 privilege level).

The binary executing at kernel privilege 1212 manages a first task 1206 and a second task 1208. In one scenario, a second task 1208 may be a security sensitive task. An example of a security sensitive task may include an encryption operation performed by second task 1208 to establish a secure communication channel, such as a user logging into their bank account. On the other hand, first task 1206 may be a malicious task. As shown in FIG. 12, first task 1206 may be configured to mount a side-channel attack by measuring the response time for certain accesses to shared hardware structures such as caches, buffers and busses.

In certain embodiments, a task may refer to a group of computer executable instructions. Example of a task may include a processing thread, a process or an application that may include multiple processes.

Furthermore, in certain implementations, FIG. 12 includes resource configuration module 1203, hardware resource allocator module 1204, hardware resource manager module 1206 and shared hardware structures 1208. Resource configuration module 1203 may be implemented as part of kernel privilege 1212 in the operating system, and hardware resource allocator module 1204, hardware resource manager module 1206 and shared hardware structures 1208 may be implemented as part of device hardware 1202, such as the processor (hardware and/or microcode).

In certain aspects, the resource configuration module 1203 may configure the underlying hardware to associate certain portions of the shared hardware structures 1208 with a specific task. In some instances, the resource configuration module 1203 may use a task ID to associate a task with a specific portion of the shared hardware structure 1208. In certain implementations, resource configuration module 1203 may configure computing device 1200 such that all access requests originating from the second task 1208 and directed towards the shared hardware structure 1208 are restricted to certain portions of the shared hardware structure 1208, and no other tasks may access the resources specific to the second task 1208. Resource configuration module 1203 may be implemented using any combination of techniques discussed above with reference to FIG. 6, where portions of the shared hardware structures are associated with the tasks and task IDs instead of the VMs and VM IDs.

The hardware resource allocator module 1204 may appropriately allocate or associate certain resources with specific tasks. The hardware resource allocator module 204, may use specific configurations, overrides or hints set by the resource configuration module 1203 from the kernel privileged code/binary 1212 in allocating or associating portions of the shared hardware resources to specific tasks. In some instances, the resource allocator module may automatically and dynamically allocate and associate the shared hardware resources for the tasks executing on the processor. Hardware resource allocator module 1204 may be implemented using any combination of techniques discussed above with reference to FIG. 4, where portions of the shared hardware structures are associated with the tasks and task IDs instead of the VMs and VM IDs.

In some aspects, hardware resource manager module 1206 may manage access to the shared hardware structures 1208. For example, in one implementation, the hardware resource allocator module 1204 may create a mapping table in the hardware resource manager module 1206 between the tasks and the particular shared hardware resources from the shared hardware structures 1208. During execution, the hardware resource manager module 1206 may provide the appropriate mapping for resource accesses. In addition, the hardware resource manager module 1206 may also provide certain hardware implemented (e.g., microcode) handlers for handling access to restricted resources during the execution of instructions belonging to a particular task. Hardware resource manager module 1206 may be implemented using any combination of techniques discussed above with reference to FIG. 5, where portions of the shared hardware structures are associated with the tasks and task IDs instead of VMs and VM IDs.

In certain aspects of the disclosure, the accesses to the shared hardware structures 1208 may be handled by the hardware resource manager module 1206 implemented in the device hardware 1202. For example, for accessing dedicated caches, buffers or other resources for a task, the access may be handled by the hardware resource manager module 1206. Although, shown as one module in the figures for ease of illustration, the shared hardware structures 1208 may be dispersed throughout the processor and/or the computing system. Shared hardware structures may include hardware resources, such as one or more of a Level 1 cache, a Level 2 cache, a Level 3 cache, Translation Look-aside Buffer (TLB), Write Combining Buffer, Branch Prediction Table, Branch Target Buffer, processor cycles, memory bus access, cache access, I/O access, and network access.

As described in FIG. 12, by dedicating portions of the shared resources to specific tasks, the kernel privileged components 1202 and/or device hardware 102 may be able protect certain tasks from side channel attacks launched from malicious tasks running simultaneously on the same computing device 1200.

Techniques and components described with reference to FIGS. 1-11 may be used in any combination to implement aspects of the modules or components, such as the kernel privileged components 1212 and/or the device hardware 1202 described in FIG. 12 to protect certain tasks from other malicious tasks executing on the computing device 1200, without deviating from the scope of the invention. In some aspects, techniques described in FIGS. 1-11 are applicable to FIG. 12 by associating portions of the shared hardware structures with tasks and task IDs instead of VMs and VM IDs.

Figure 13:
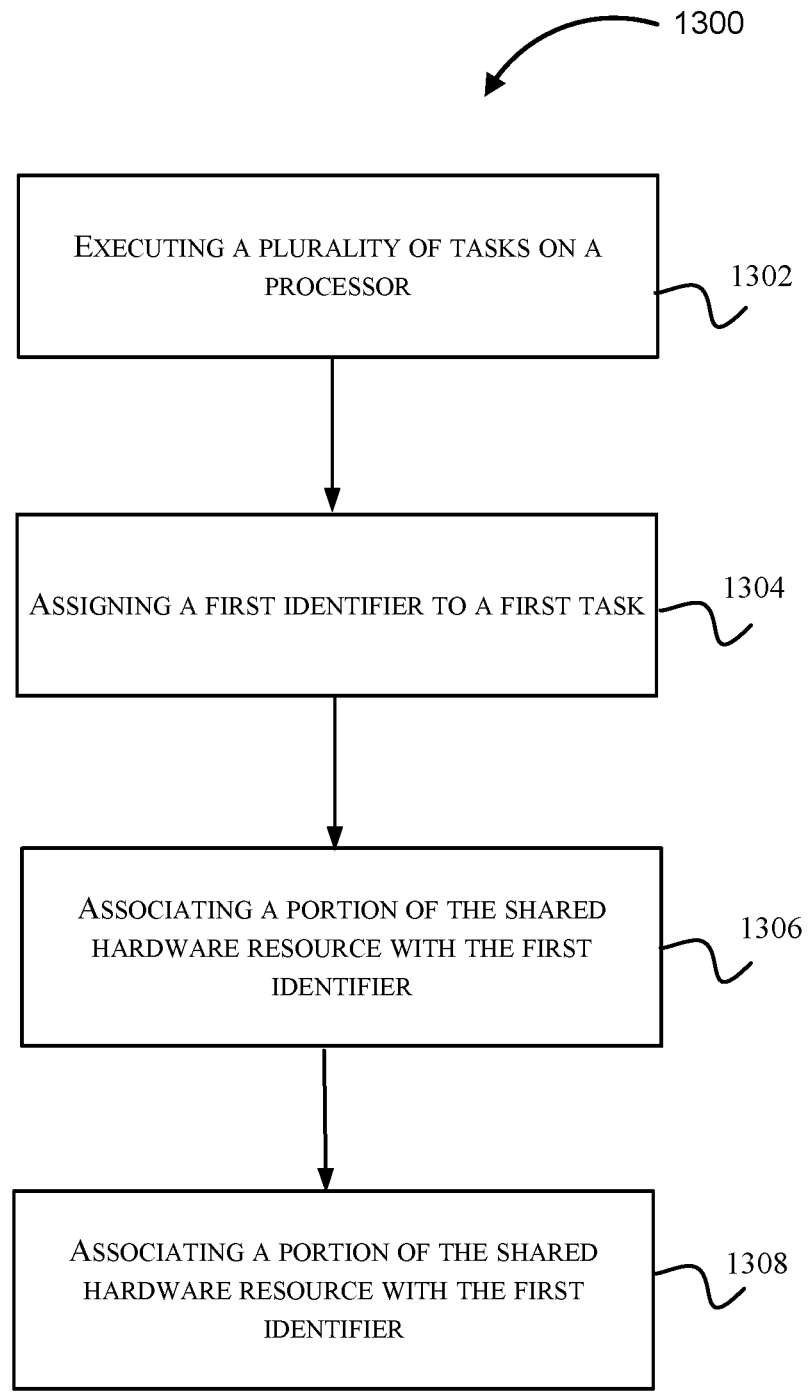
FIG. 13 illustrates a flow diagram for a method for providing dedicated resources from shared resources to a task, according to one or more aspects of the disclosure.

FIG. 13 illustrates a flow diagram for a method for restricting observability and/or access to shared hardware resources, according to one or more aspects of the disclosure. Some or all of the process 1300 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory.

At step 1302, components of the computing device, such as a processor, execute a plurality of tasks on the processor. In certain implementations of the processor, the processor may include one or more logical processors, such multiple processing cores and/or processing threads. Each task may include a plurality of computer executable instructions. Example of a task may include a processing thread, a process or an application that may include multiple processes.

In some aspects, the plurality of tasks executing on the processor share a hardware resource associated with the processor. In some instances, the sharing of the hardware resources may allow one task to spy and steal secrets from another task operating on the processor. Examples of the shared hardware resource may include one or more of a Level 1 cache, a Level 2 cache, a Level 3 cache, Translation Look-aside Buffer (TLB), Write Combining Buffer, Branch Prediction Table, Branch Target Buffer, processor cycles, memory bus access, cache access, I/O access, and network access.

In certain aspects, the plurality of tasks execute using the same execution pipeline on one of the processing cores. In certain other aspects, each of the plurality of tasks are distinct processing threads executing on logical processors associated with the processor. Furthermore, executing two tasks, in some instances, may include concurrently processing at least one computer executable instruction belonging to a first task and at least another computer executable instruction belonging to a second task, wherein neither of the instructions belonging to the first task or the second task has completed. In some embodiments of the disclosure, each of the plurality of tasks belongs to a separate virtual machine executing on the processor.

At step 1304, in certain aspects, a first identifier is assigned to a first task from the plurality of tasks executing on the processor. Hardware, software or firmware components may be used in assigning the first task from the plurality of tasks the first identifier.

At step 1306, components of the computing device, such as the hardware resource allocation module, may be configured to associate a portion of the shared hardware resource from the shared hardware structure with the first identifier.

In one implementation, associating the portion of the hardware resource with the first identifier may include assigning a second identifier to the portion of the hardware resource, and associating the first identifier with the second identifier.

In another implementation, associating the portion of the hardware resource with the first identifier may include associating the portion of the hardware resource with the first identifier includes the hardware resource allocator configured to tag the portion of the hardware resource with the first identifier.

At step 1308, components of the computing device, such as the hardware resource management module, may be configured to restrict observability for computer executable instructions executed from any task other than the first task to the portion of the hardware resource associated with the first identifier, such that the other task cannot infer information associated with the execution of the first task. This separates out the resources for the first tasks and other tasks so that the operations and execution of the first task is protected from spying from other tasks.

In one implementation, restricting access to the portion of the hardware resource associated with the first identifier may include restricting access such that the computer executable instructions executed from the first task can only access the portion of the hardware resource associated with the first identifier from the hardware resource.

In another implementation, restricting access to the portion of the hardware resource associated with the first identifier may include restricting access such that the computer executable instructions executed from the first task cannot access the portion of the hardware resource associated with the first identifier from the hardware resource.

It should be appreciated that the specific steps illustrated in FIG. 13 provide a particular method of switching between modes of operation, according to one embodiment. Other sequences of steps may also be performed in alternate embodiments. For example, alternative embodiments may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 13 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

Figure 14:
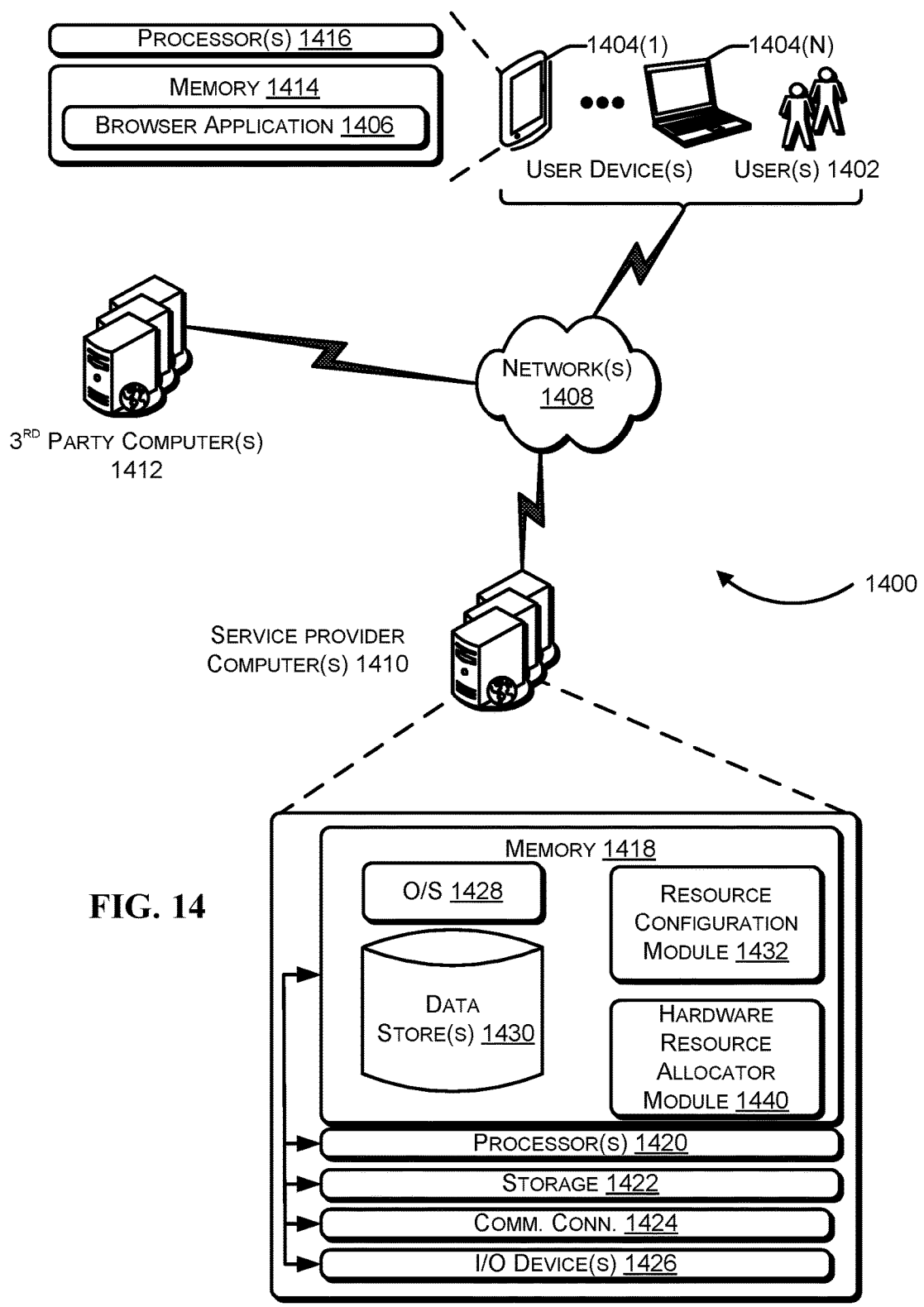
FIG. 14 illustrates an exemplary architecture for features and systems described herein that includes one or more service provider computers and/or a user device connected via one or more networks, according to at least one exemplary embodiment.

FIG. 14 illustrates an exemplary architecture for features and systems described herein that includes one or more service provider computers and/or a user device connected via one or more networks, according to at least one exemplary embodiment. The devices discussed in FIGS. 1-13, may use one or more components of the computing devices described in FIG. 14 or may represent one or more computing devices described in FIG. 14. In architecture 1400, one or more users 1402 may utilize user computing devices 1404(1)-(N) (collectively, user devices 1404) to access application 1406 (e.g., a web browser or mobile device application), via one or more networks 1408. In some aspects, application 1406 may be hosted, managed and/or provided by a computing resources service or service provider. One or more service provider computers 1410 may provide a native application which is configured to run on user devices 1404 which user(s) 1402 may interact with. Service provider computer(s) 1410 may, in some examples, provide computing resources such as, but not limited to, client entities, low latency data storage, durable data storage, data access, management, virtualization, cloud-based software solutions, electronic content performance management, etc. Service provider computer(s) 1410 may also be operable to provide web hosting, computer application development and/or implementation platforms, combinations of the foregoing or the like to user(s) 1402. Service provider computer(s) 1410, in some examples, may communicate with one or more third party computers 1412.

In some examples, network(s) 1408 may include any one or a combination of many different types of networks, such as cable networks, the Internet, wireless networks, cellular networks and other private and/or public networks. While the illustrated example represents user(s) 1402 accessing application 1406 over network(s) 1408, the described techniques may equally apply in instances where user(s) 1402 interact with service provider computer(s) 1410 via user device(s) 1404 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1406 may allow user(s) 1402 to interact with service provider computer(s) 1410 such as to access web content (e.g., web pages, music, video, etc.). Service provider computer(s) 1410, perhaps arranged in a cluster of servers or as a server farm, may host application 1406 and/or cloud-based software services. Other server architectures may also be used to host application 1406. Application 1406 may be capable of handling requests from many users 1402 and serving, in response, various item web pages. Application 1406 can provide any type of website that supports user interaction, including social networking sites, online retailers, informational sites, blog sites, search engine sites, news and entertainment sites and so forth. As discussed above, the described techniques can similarly be implemented outside of application 1406, such as with other applications running on user device(s) 1404.

User device(s) 1404 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1404 may be in communication with service provider computer(s) 1410 via network(s) 1408, or via other network connections. Additionally, user device(s) 1404 may be part of the distributed system managed by, controlled by or otherwise part of service provider computer(s) 1410 (e.g., a console device integrated with service provider computers 1410).

In one illustrative configuration, user device(s) 1404 may include at least one memory 1414 and one or more processing units (or processor(s)) 1416. Processor(s) 1416 may be implemented as appropriate in hardware, computer-executable instructions, firmware, or combinations thereof. Computer-executable instruction or firmware implementations of processor(s) 1416 may include computer-executable or machine-executable instructions written in any suitable programming language to perform the various functions described. User device(s) 1404 may also include geo-location devices (e.g., a global positioning system (GPS) device or the like) for providing and/or recording geographic location information associated with user device(s) 1404.

Memory 1414 may store program instructions that are loadable and executable on processor(s) 1416, as well as data generated during the execution of these programs. Depending on the configuration and type of user device(s) 1404, memory 1414 may be volatile (such as random access memory (RAM)) and/or non-volatile (such as read-only memory (ROM), flash memory, etc.). User device(s) 1404 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1414 may include multiple different types of memory, such as static random access memory (SRAM), dynamic random access memory (DRAM), or ROM.

Turning to the contents of memory 1414 in more detail, memory 1414 may include an operating system and one or more application programs or services for implementing the features disclosed herein including at least a user provided input element or electronic service web page, such as via browser application 1406 or dedicated applications (e.g., smart phone applications, tablet applications, etc.). Browser application 1406 may be configured to receive, store and/or display a website or other interface for interacting with service provider computer(s) 1410. Additionally, memory 1414 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1404.

In some aspects, service provider computer(s) 1410 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1410 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1410 may be in communication with user device(s) 1404 and/or other service providers via network(s) 1408, or via other network connections. Service provider computer(s) 1410 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1410 may include at least one memory 1418 and one or more processing units (or processor(s)) 1420. Processor(s) 1420 may be implemented as appropriate in hardware, computer-executable instructions, firmware or combinations thereof. Computer-executable instruction or firmware implementations of processor(s) 1420 may include computer-executable or machine-executable instructions written in any suitable programming language to perform the various functions described.

In some instances, hardware processor(s) 1420 may be a single core processor or a multi-core processor. A multi-core processor may include multiple processing units within the same processor. In some embodiments, the multi-core processors may share certain resources, such as busses and first, second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1418 may store program instructions that are loadable and executable on processor(s) 1420, as well as data generated during the execution of these programs. Depending on the configuration and type of service provider computer(s) 1410, memory 1418 may be volatile (such as RAM) and/or non-volatile (such as ROM, flash memory, etc.). Service provider computer(s) 1410 or servers may also include additional storage 1422, which may include removable storage and/or non-removable storage. The additional storage 1422 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1418 may include multiple different types of memory, such as SRAM, DRAM, or ROM.

Memory 1418, the additional storage 1422, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1418 and the additional storage 1422 are all examples of computer storage media. Additional types of computer storage media that may be present in service provider computer(s) 1410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1410. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1410 may also contain communications connection(s) 1424 that allow service provider computer(s) 1410 to communicate with a stored database, another computing device or server, user terminals and/or other devices on network(s) 1408. Service provider computer(s) 1410 may also include I/O device(s) 1426, such as a keyboard, a mouse, a pen, a voice input device, a touch input device, a display, speakers, a printer and the like.

Memory 1418 may include an operating system 1428, one or more data stores 1430 and/or one or more application programs or services for implementing the features disclosed herein, including an resource configuration module 1432 and a hardware resource allocator module 1440. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 14, and/or functions described herein can be provided by one or more modules that exist as separate modules and/or module functions described herein can be spread over multiple modules.

Figure 15:
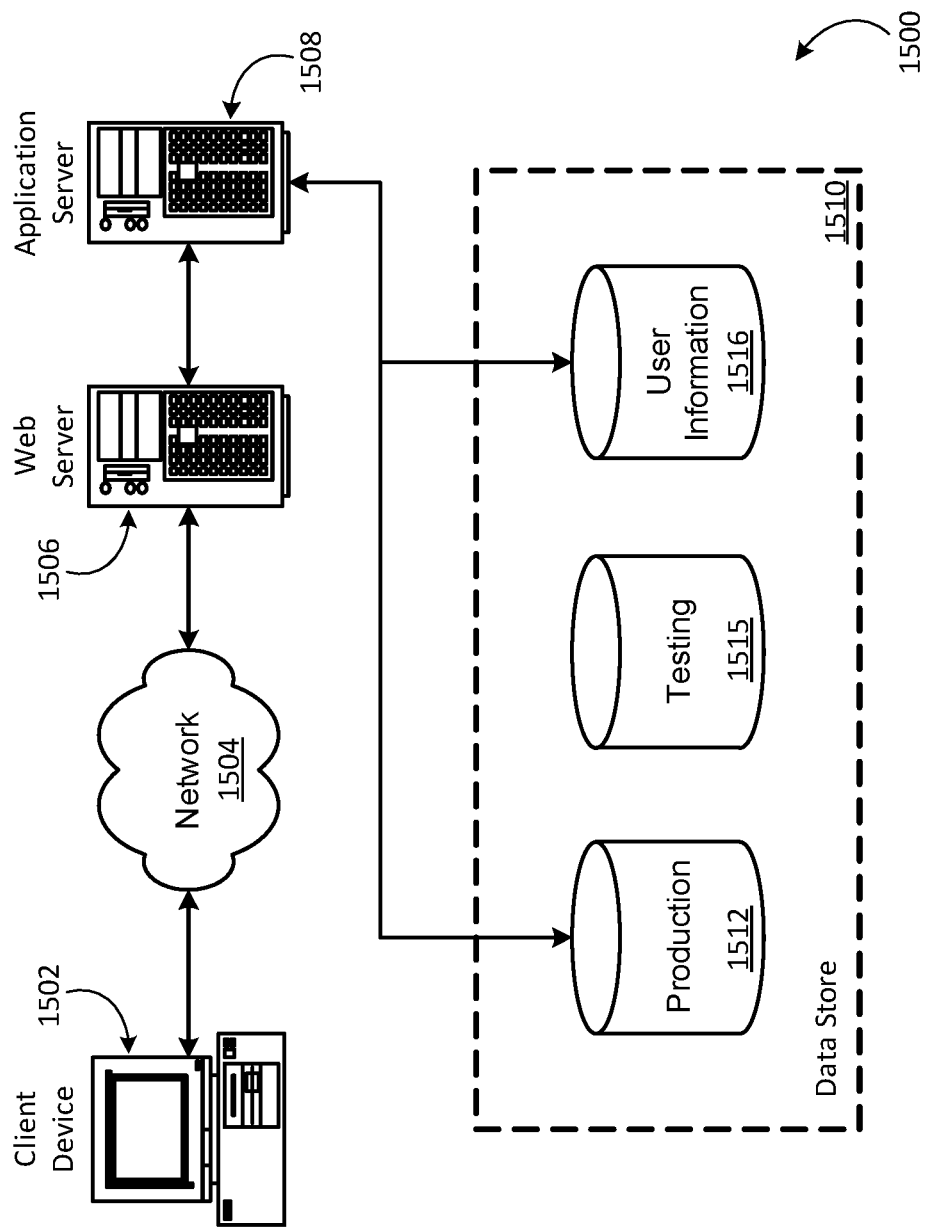
FIG. 15 illustrates an environment in which various embodiments can be implemented.

FIG. 15 illustrates aspects of an exemplary environment 1500 for implementing various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between client device 1502 and application server 1508, can be handled by the Web server. It should be understood that the Web and application servers are not required and are merely example components, as structured code discussed herein can be executed on any appropriate device or host machine as discussed elsewhere herein.

Data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store may also include a mechanism for storing log data, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in data store 1510. Data store 1510 is operable, through logic associated therewith, to receive instructions from application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on user device 1502. Information for a particular item of interest can be viewed in a dedicated page or window of the browser. Several different types of devices, such as user devices and servers have been described with reference to FIG. 15. The devices discussed in FIGS. 1-13, may use one or more components of the devices described in FIG. 15 and/or represent one or more devices described in FIG. 15.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

In various embodiments, a CPU may be referred to as a hardware processor or processing unit. In some instances, the processor may be a single core processor or a multi-core processor. A multi-core processor may include multiple processing units within the same processor. In some embodiments, the multi-core processors may share certain resources, such as busses and first, second or third level of cache between multiple-cores. In some instances, each core in a single or multi-core processor may also include multiple executing logical processors (or threads). In such a core, that supports multiple logical processors, several stages of the execution pipeline and also lower level caches may also be shared.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computing device, comprising:
   a processor executing at least one computer executable instruction belonging to a first task and at least another computer executable instruction belonging to a second task, wherein neither of the computer executable instructions have completed execution;
   a bus in the processor being accessed by operations associated with execution of computer executable instructions for the first task and the second task;
   a hardware resource allocator, to:
   assign a first identifier to the first task; and
   associate a portion of time for accessing the bus with the first identifier; and
   a hardware resource manager in the processor to restrict access to the bus, for the operations associated with the computer executable instructions executed from the first task, such that the operations associated with the first task access the bus for the portion of the time that the bus is associated with the first identifier, thereby preventing the computer executable instructions from the second task from obtaining information associated with the execution of the computer executable instructions from the first task.

2. The computing device of claim 1, wherein the hardware resource manager is further configured to prevent access for the operations of the computer executable instructions executed from the second task to the bus associated with the first identifier for the portion of the time.

3. The computing device of claim 1, wherein associating the portion of the time for accessing the bus with the first identifier comprises the hardware resource allocator being further configured to:
   assign a second identifier to the bus for the portion of the time; and
   associate the first identifier with the second identifier.

4. The computing device of claim 1, wherein the bus is a memory bus.

5. The computing device of claim 1, wherein the processor comprises a plurality of processing cores.

6. The computing device of claim 1, wherein the first task and the second task are one or more of a processing thread, a process, or an application executing on the processor.

7. The computing device of claim 1, wherein the first task executes the computer executable instructions in a first virtual machine and the second task executes the computer readable instructions in a second virtual machine.

8. The computing device of claim 1, wherein the first task and the second task execute their respective computer readable instructions using same execution pipeline on a processing core of the processor.

9. A method, comprising:
   executing, by a processor, at least one computer executable instruction belonging to a first task and at least another computer executable instruction belonging to a second task, wherein neither of the computer executable instructions have completed execution;
   assigning, a first identifier to the first task;
   associating a portion of time associated with accessing a bus in the processor with the first identifier; and
   restricting observability to the bus for the portion of the time that the bus is associated with the first identifier for computer executable instructions executed from the second task by preventing access by operations associated with the computer executable instructions executed from the second task to the bus for the portion of the time that the bus is associated with the first identifier, thereby preventing the computer executable instructions from the second task from obtaining information associated with the execution of the computer executable instructions from the first task.

10. The method of claim 9, wherein restricting observability to the bus for the portion of the time that the bus is associated with the first identifier further comprises a hardware resource manager restricting access by computer executable instructions executed from the first task to the bus associated with the first identifier for the portion of the time, such that operations associated with the first task only access the bus for the portion of the time that the bus is associated with the first identifier.

11. The method of claim 9, wherein associating the portion of the time for accessing the bus with the first identifier comprises:
   assigning a second identifier to the bus for the portion of the time; and
   associating the first identifier with the second identifier.

12. The method of claim 9, wherein the processor comprises a plurality of processing cores.

13. The method of claim 9, wherein the first task and the second task are one or more of a processing thread, a process or an application executing on the processor.

14. The method of claim 9, wherein the first task executes the computer executable instructions in a first virtual machine and the second task executes the computer readable instructions in a second virtual machine.

15. The method of claim 9, wherein the first task and the second task execute their respective computer readable instructions using same execution pipeline on a processing core of the processor.

16. A computing device, comprising:
a processor executing at least one computer executable instruction belonging to a first task and at least another computer executable instruction belonging to a second task, wherein neither of the computer executable instructions have completed execution;
a bus in the processor being accessed by operations associated with execution of computer executable instructions for the first task and the second task;
a hardware resource allocator, to:
assign a first identifier to the second task; and
associate a portion of time for accessing the bus with the first identifier; and
a hardware resource manager in the processor to restrict, for the operations of the computer executable instructions executed by the second task, access to the bus during the portion of the time that the bus is associated with the first identifier, thereby preventing the computer executable instructions from the second task from obtaining information associated with the execution of the computer executable instructions from the first task, wherein restricting access to the bus for the portion of the time that the bus is associated with the first identifier comprises preventing access, by the operations of the computer executable instructions executed from the second task, to the bus for the portion of the time that the bus is associated with the first identifier.

17. The computing device of claim 16, wherein the first task and the second task are one or more of a processing thread, a process, or an application executing on the processor.

18. The computing device of claim 16, wherein the first task executes the computer executable instructions in a first virtual machine and the second task executes the computer readable instructions in a second virtual machine.

19. A method, comprising:
executing, by a processor, at least one computer executable instruction belonging to a first task and at least another computer executable instruction belonging to a second task, wherein neither of the computer executable instructions have completed execution;
assigning, a first identifier to the second task;
associating a portion of time associated with accessing a bus in the processor with the first identifier; and
restricting observability to the bus for the portion of the time that the bus is associated with the first identifier for operations associated with computer executable instructions executed from the second task, wherein restricting observability to the bus for the portion of the time that the bus is associated with the first identifier comprises preventing access, by operations of the computer executable instructions executed from the second task, to the bus for the portion of the time that the bus is associated with the first identifier, thereby preventing the computer executable instructions from the second task from obtaining information associated with the execution of the computer executable instructions from the first task.

20. The method of claim 19, wherein the first task and the second task are one or more of a processing thread, a process, or an application executing on the processor.

21. The method of claim 19, wherein the first task executes the computer executable instructions in a first virtual machine and the second task executes the computer readable instructions in a second virtual machine.

* * * * *